(12) United States Patent
Kim et al.

(10) Patent No.: US 7,934,581 B2
(45) Date of Patent: May 3, 2011

(54) BROADBAND NOISE RESONATOR

(75) Inventors: Geon-Seok Kim, State College, PA (US); Rodney C. Glover, St. Clair Shores, MI (US)

(73) Assignee: Eaton Corporation, Cleveland, OH (US)

( * ) Notice: Subject to any disclaimer, the term of this patent is extended or adjusted under 35 U.S.C. 154(b) by 21 days.

(21) Appl. No.: 12/363,088

(22) Filed: Jan. 30, 2009

(65) Prior Publication Data

US 2010/0193282 A1 Aug. 5, 2010

(51) Int. Cl.
*F01N 1/02* (2006.01)
(52) U.S. Cl. ........ 181/250; 181/212; 181/214; 181/272; 181/247; 181/276; 123/184.53; 123/184.55; 123/184.56; 123/184.57
(58) Field of Classification Search .................. 181/212, 181/250, 214, 247, 272, 276; 123/184.53, 123/184.54, 184.55, 184.56, 184.57
See application file for complete search history.

(56) References Cited

U.S. PATENT DOCUMENTS

| | | | | |
|---|---|---|---|---|
| 2,332,543 | A * | 10/1943 | Wilson | 181/251 |
| 4,164,266 | A * | 8/1979 | Collin et al. | 181/250 |
| 5,839,405 | A | 11/1998 | Falkowski et al. | |
| 5,979,598 | A | 11/1999 | Wolf et al. | |
| 6,659,222 | B1 * | 12/2003 | Allman | 181/282 |
| 6,752,240 | B1 * | 6/2004 | Schlagenhaft | 181/249 |
| 6,983,820 | B2 | 1/2006 | Boast et al. | |
| 7,198,017 | B2 * | 4/2007 | Vogt et al. | 123/184.57 |
| 7,584,821 | B2 * | 9/2009 | Prior et al. | 181/241 |
| 2003/0085071 | A1 * | 5/2003 | Boast et al. | 181/249 |

(Continued)

FOREIGN PATENT DOCUMENTS

DE 4327562 2/1995

(Continued)

OTHER PUBLICATIONS

International Search Report dated May 19, 2010 (4 pages).

(Continued)

*Primary Examiner* — Elvin G Enad
*Assistant Examiner* — Forrest M Phillips
(74) *Attorney, Agent, or Firm* — Rader, Fishman & Grauer PLLC

(57) ABSTRACT

An apparatus comprising includes a conduit portion having a conduit inner surface and a conduit outer surface, and a plurality of chambers in fluid communication with the conduit portion. The chambers include a first chamber defined, at least in part, by a first outer housing and a first chamber volume. The first chamber is in fluid communication with the conduit portion. A fluid is permitted to flow between the conduit portion and the first chamber through a first flow area. The chambers also include a second chamber defined, at least in part, by a second outer housing and a second chamber volume. The second chamber is in fluid communication with the conduit portion. A fluid is permitted to flow between the conduit portion and the second chamber through a second flow area. The first chamber volume is generally equal to the second chamber volume and the first flow area is greater than the second flow area. The chambers further include a third chamber defined, at least in part, by a third outer housing and a third chamber volume. The third chamber is in fluid communication with the conduit portion. A fluid is permitted to flow between the conduit portion and the third chamber through a third flow area, wherein the first chamber volume is greater than the third chamber volume.

23 Claims, 21 Drawing Sheets

U.S. PATENT DOCUMENTS

| | | | |
|---|---|---|---|
| 2005/0067220 A1* | 3/2005 | Keller et al. | 181/250 |
| 2005/0150718 A1* | 7/2005 | Knight et al. | 181/250 |
| 2005/0284691 A1 | 12/2005 | Voss et al. | |
| 2006/0180388 A1* | 8/2006 | Brown et al. | 181/250 |

FOREIGN PATENT DOCUMENTS

| | | |
|---|---|---|
| DE | 19956165 | 5/2001 |
| EP | 0573895 | 12/1993 |
| EP | 0911567 | 4/1999 |
| WO | WO-02101227 | 12/2002 |

OTHER PUBLICATIONS

Delphion English Abstract for EP0573895A1 (2 pages).
Delphion English Abstract for EP0911567A1 (2 pages).
Delphion English Abstract for DE4327562A1 (2 pages).
Delphion English Abstract for DE19956165A1 (2 pages).

* cited by examiner

FIG 2A
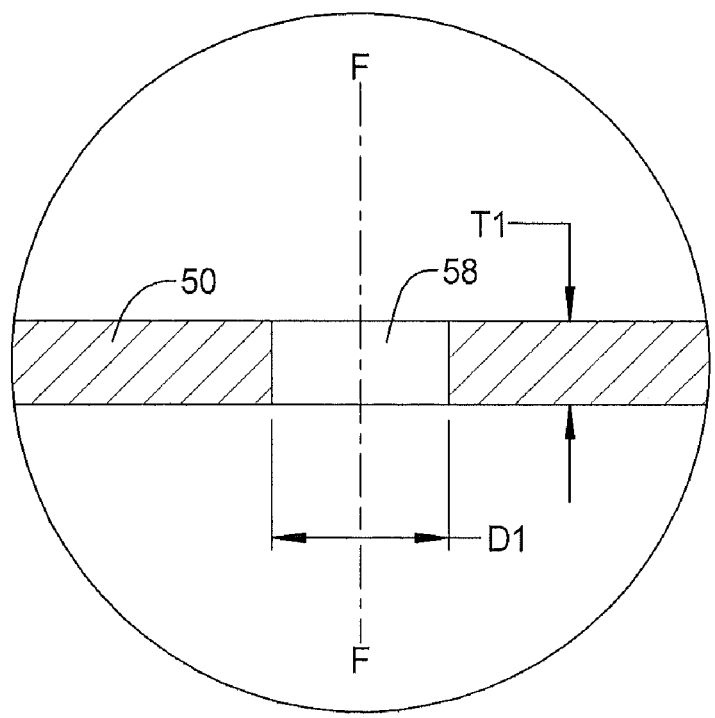
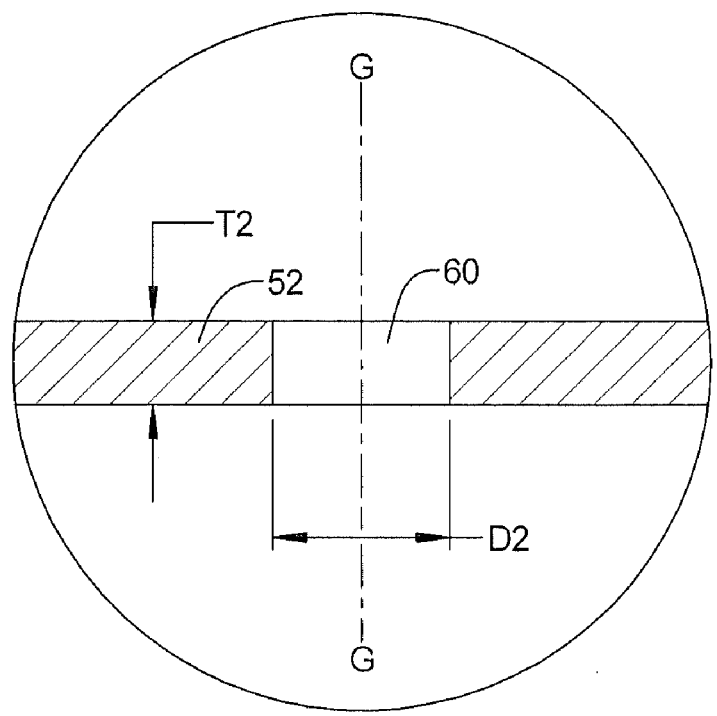
FIG 2B

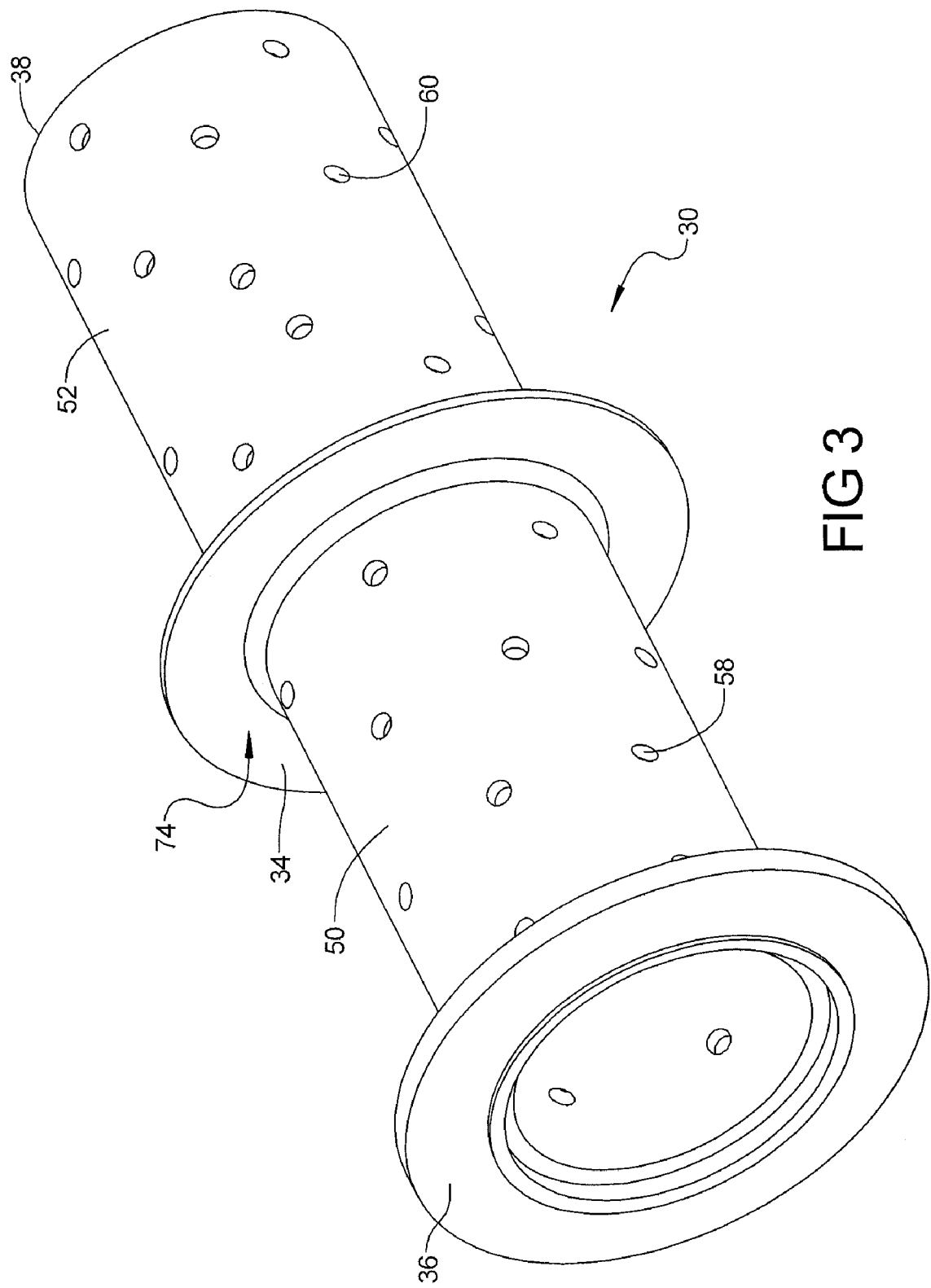

FIG 8C
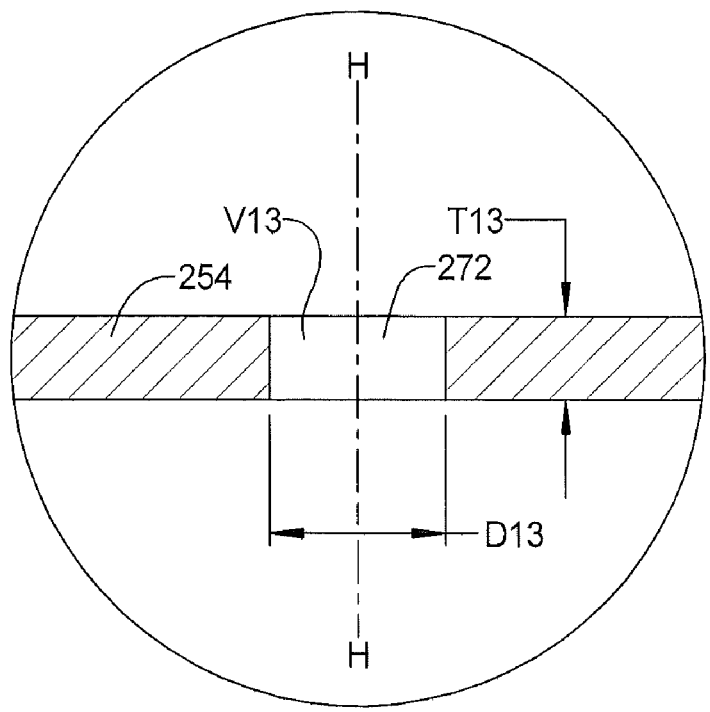
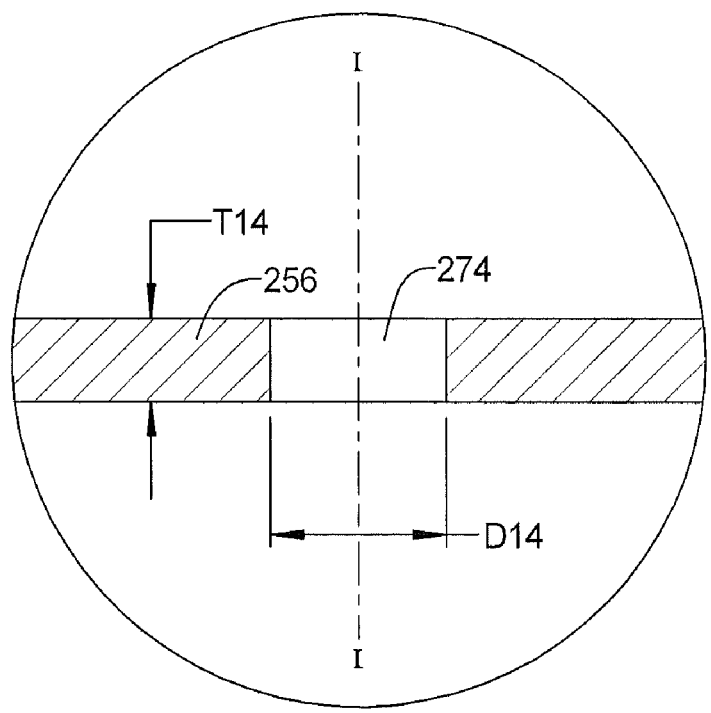
FIG 8D

BROADBAND NOISE RESONATOR

TECHNICAL FIELD

The disclosure generally relates to noise suppression resonators.

BACKGROUND

Supercharger and turbocharger compressors typically emit a distinctive noise, often referred to as a whine, during operation, especially at high loadings. These high loadings are typically when the compressor is compressing air for an internal combustion engine at a compression ratio that is on the higher end of a compression ratio range. This noise may attain an undesirable level if uncorrected. Accordingly, a need exists for reducing the noise output of compressors.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

FIG. 2A is an enlarged view of portion 2A of FIG. 2.

FIG. 2B is an enlarged view of portion 2B of FIG. 2.

FIG. 3 is perspective view of an inner portion of the resonator of FIG. 1.

FIG. 8C is an enlarged view of portion 8C of FIG. 8.
FIG. 8D is an enlarged view of portion 8D of FIG. 8.

DETAILED DESCRIPTION

Figure 1:
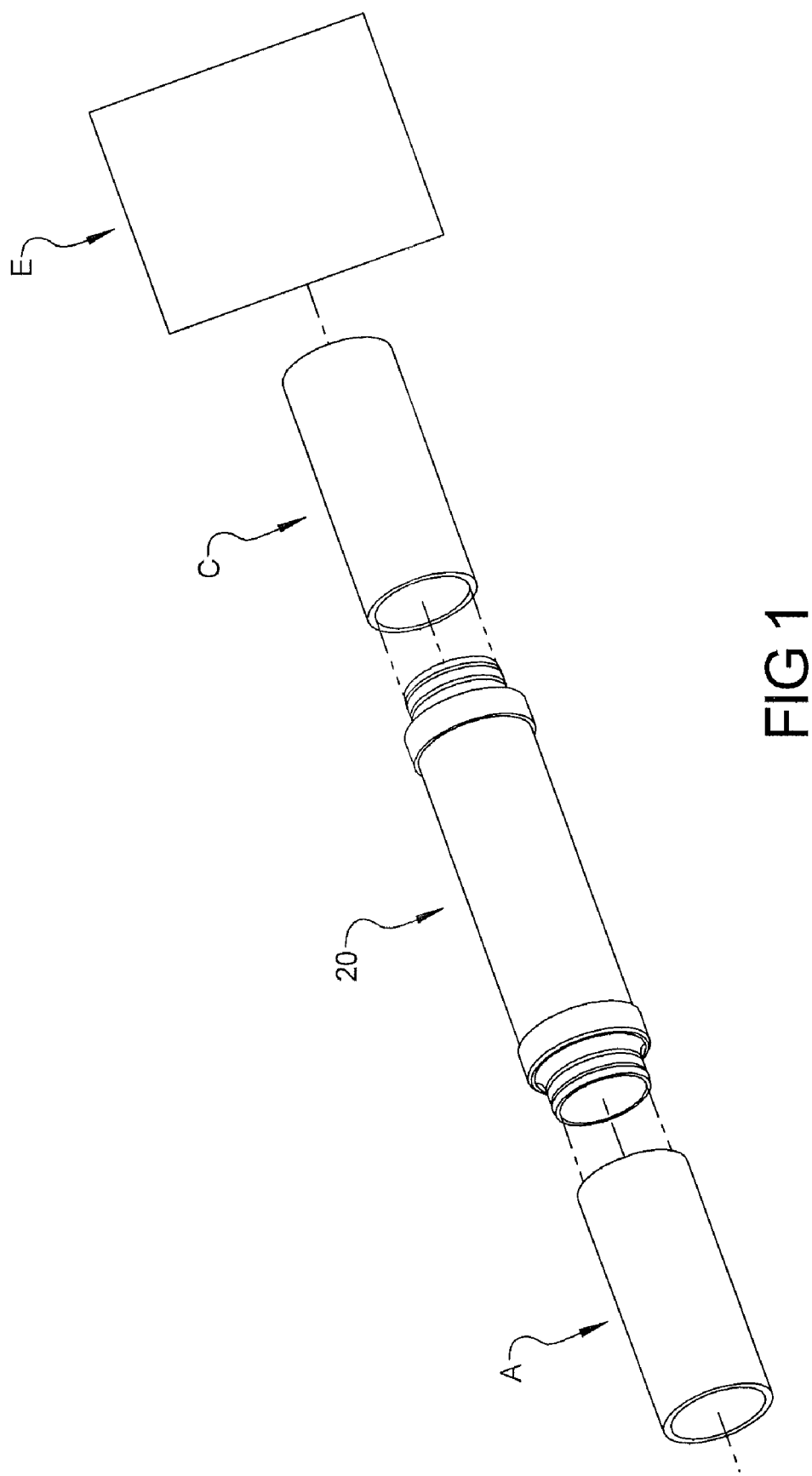
FIG. 1 is a perspective view of a noise resonator, according to an embodiment.

FIG. 1 illustrates a schematic representation of an engine and intake system to include an engine E, a compressor C, a noise resonator 20, and an air filter A. In the embodiment illustrated, the engine is an internal combustion engine and the compressor is a portion of a supercharger. The resonator 20 generally operates to reduce the noise transmitted by the compressor that may resonate through the intake. The resonator 20 generally defines an axis A-A and includes an outer shell 22, an inlet 24 and an outlet 26. The noise resonator 20 is further illustrated in FIGS. 2-4 to include an inner member 30 having a conduit portion 32, a first annular wall 34, a second annular wall 36, and a generally annular mating end 38.

Figure 2:
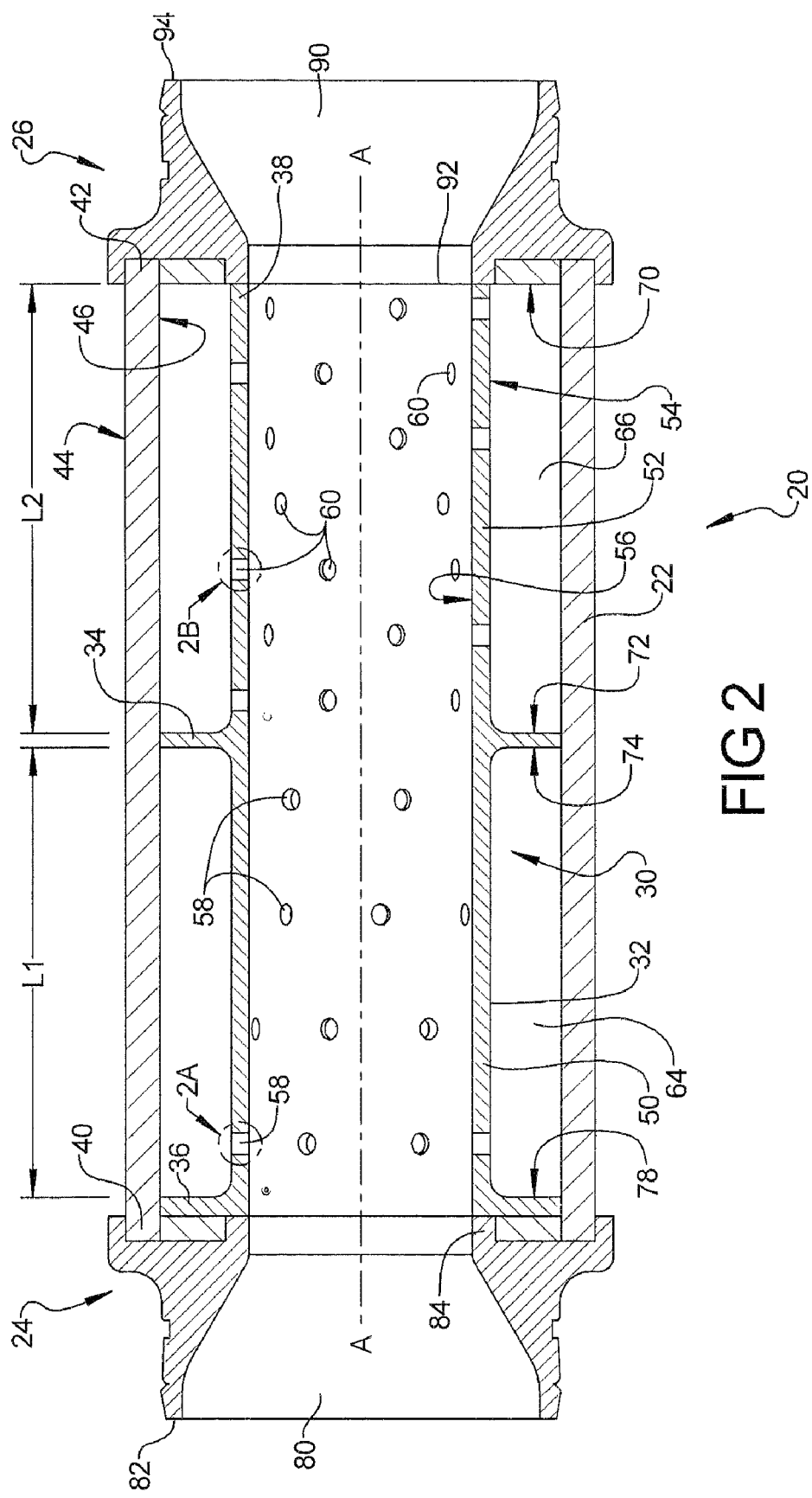
FIG. 2 is a sectional view of the resonator of FIG. 1.

In the exemplary embodiment illustrated, the shell 22 is a generally cylindrical housing and includes a first end 40, a second end 42, a shell outside surface 44, and a shell inside surface 46. As best seen in FIG. 2, the conduit portion 32 includes a first conduit portion 50, a second conduit portion 52, an outside conduit surface 54, an inside conduit surface 56, a plurality of first conduit apertures 58, and a plurality of second conduit apertures 60. In the illustration of FIG. 2, all of the apertures shown in the sectioned portion of the first conduit portion 50 are first conduit apertures 58, while all of the apertures shown in the sectioned portion of the second conduit portion 52 are second conduit apertures 60.

The outlet 26 includes a generally annular inside surface 70 for sealing with the mating end 38. The first annular wall includes a generally annular first surface 72, a generally annular second surface 74, and a generally cylindrical wall outer surface 76. The second annular wall 36 includes a generally annular surface 78. The shell inside surface 46, the outside conduit surface 54, the second surface 74 of the first annular wall 34 and the annular surface 78 of the second annular wall 36 define a first chamber 64. The shell inside surface 46, the outside conduit surface 54, the first surface 72 of the first annular wall 34 and the annular inside surface 70 of the outlet 26 define a second chamber 66. As illustrated, the distance between the second surface 74 of the first annular wall 34 and the annular surface 78 of the second annular wall 36 is a length L1. The distance between the first surface 72 of the first annular wall 34 and the annular inside surface 70 is a length L2.

In the exemplary embodiment illustrated, the first chamber 64 and the second chamber 66 have generally the same volume. In the embodiment illustrated, the shell inside surface 46 and the outside conduit surface each have generally consistent diameters along the lengths L1 and L2. Also in the embodiment illustrated, the length L1 is equal to the length L2. That is, the distance between the first annular wall 34 and the second annular wall 36 is equal to the distance between the first annular wall 34 and the outlet 26.

Figure 4:
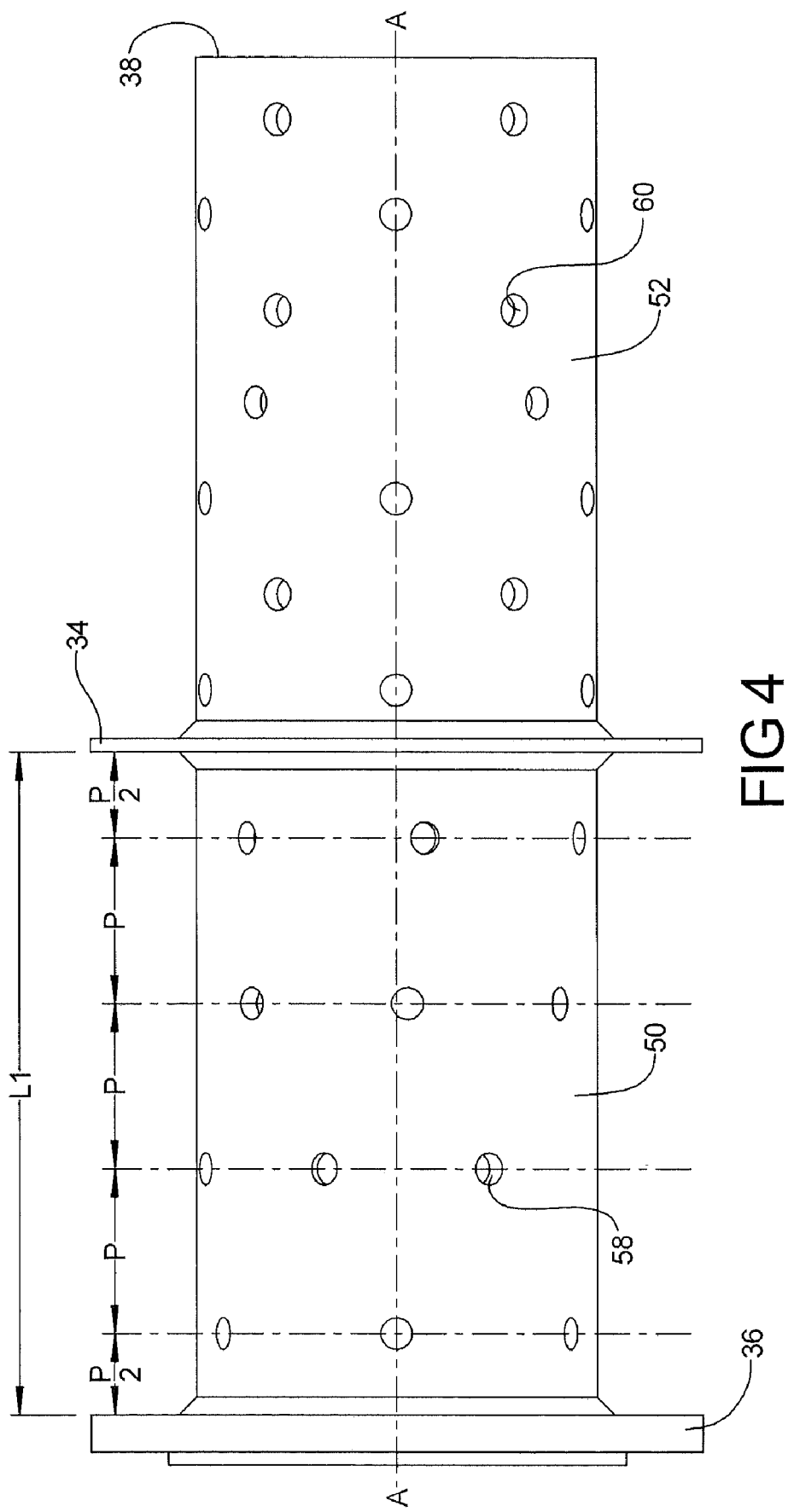
FIG. 4 is a side view of the inner portion of FIG. 3.

In the exemplary embodiment illustrated, each first conduit aperture 58 is generally cylindrical and defined by an axis F-F, while each second conduit aperture 60 is generally cylindrical and defined by an axis G-G, although the first conduit apertures 58 and the second conduit apertures 60 need not be cylindrical. Each first conduit aperture 58 is generally the same diameter as each second conduit aperture 60. Additionally, the number of second conduit apertures 60 is greater than the number of the first conduit apertures 58. In one embodiment, the resonator 20 has twenty-four (24) first conduit apertures 58 and thirty-four (34) second conduit apertures 60, where the first conduit apertures 58 are generally the same diameter as the second conduit apertures 60. Also in the embodiment illustrated, the axes F-F and G-G intersect the axis A-A. As best seen in FIGS. 2-4, the first conduit apertures 58 are generally evenly distributed within the first conduit portion 50, and the second conduit apertures 60 are generally evenly distributed within the second conduit portion 52.

The inlet 24 is defined by a throat 80 for directing fluid flow from a first inlet end 82 to a second inlet end 84. The outlet 26 is defined by a throat 90 for directing fluid flow from a first inlet end 92 to a second inlet end 94.

As best seen in FIG. 2A, an exemplary first conduit aperture 58 generally defines a first diameter D1 and a thickness T1, which is generally the thickness of the first conduit portion 50 (distance between the outside conduit surface 54 and the inside conduit surface 56). Referring to FIG. 2B, an exemplary second conduit aperture 60 generally defines a second diameter D2 and a thickness T2, which is generally the thickness of the second conduit portion 52. The total area provided between the interior of the conduit portion 32 and the first chamber 64 is equal to the number of first conduit apertures 58 multiplied by the area of each first conduit aperture 58. Similarly, the total area provided between the interior of the conduit portion 32 and the second chamber 64 is equal to the number of second conduit apertures 60 multiplied by the area of each second conduit aperture 60.

When assembled as illustrated in FIG. 2, the first chamber 64 is generally air tight with the exception of the first conduit apertures 58, and the second chamber 66 is generally air tight with the exception of the second conduit apertures 60. That is, air may enter and exit the first chamber 64 only through the first conduit apertures 58, and air may enter and exit the second chamber 66 only through the second conduit apertures 60.

Figure 5:
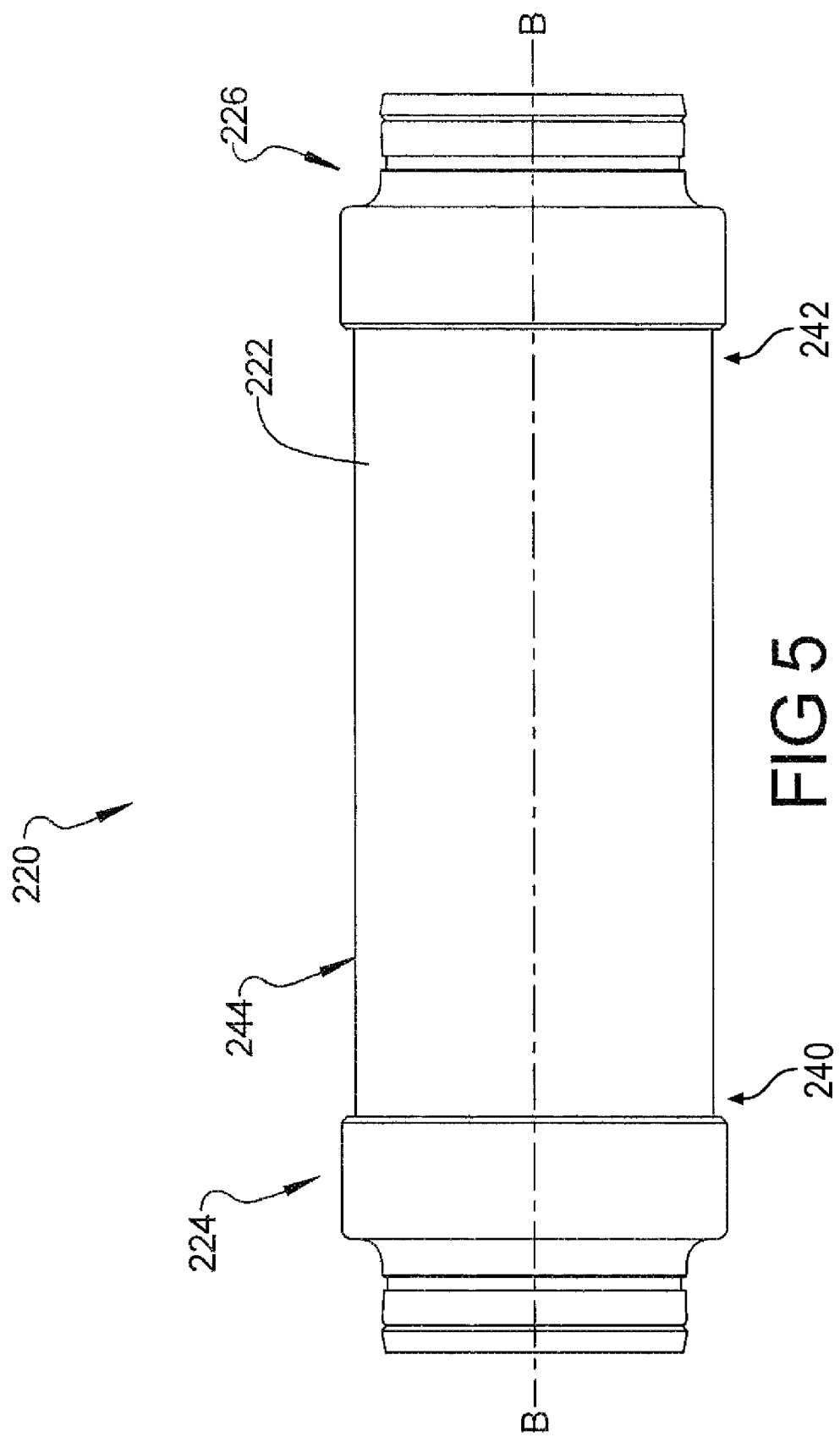
FIG. 5 is a side view of a resonator, according to an embodiment.

FIG. 5 illustrates another embodiment of a resonator as a resonator 220. The resonator 220 generally defining an axis B-B and having an outer shell 222, an inlet 224 and an outlet 226. The noise resonator 220 is further illustrated in FIGS. 6-8 to include a second inner member 230 having a conduit portion 232, a first inner member end 234, a second inner member end 236, and a mating flange 238.

Figure 6:
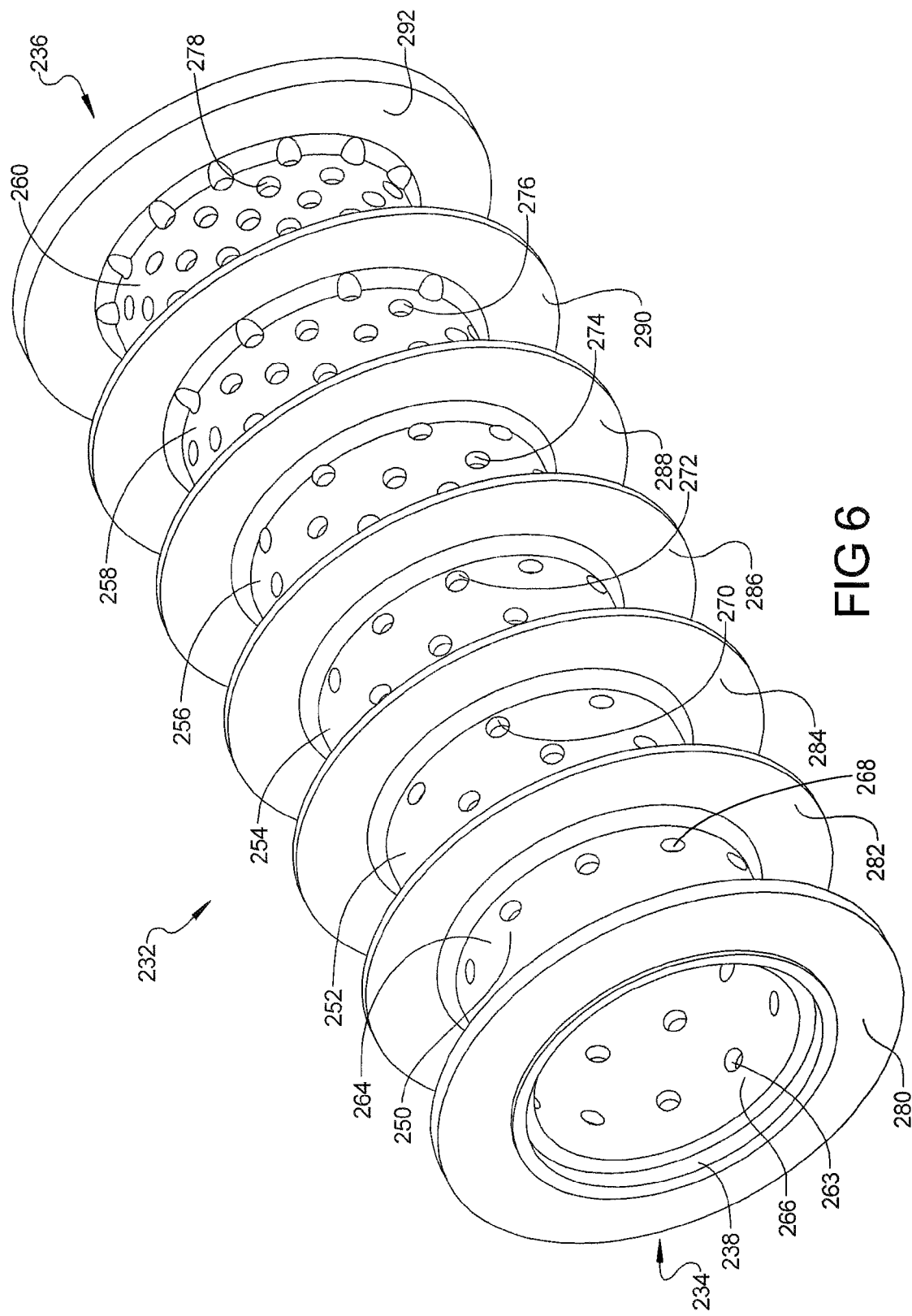
FIG. 6 is a perspective view of an inner portion of the resonator of FIG. 5.
Figure 7:
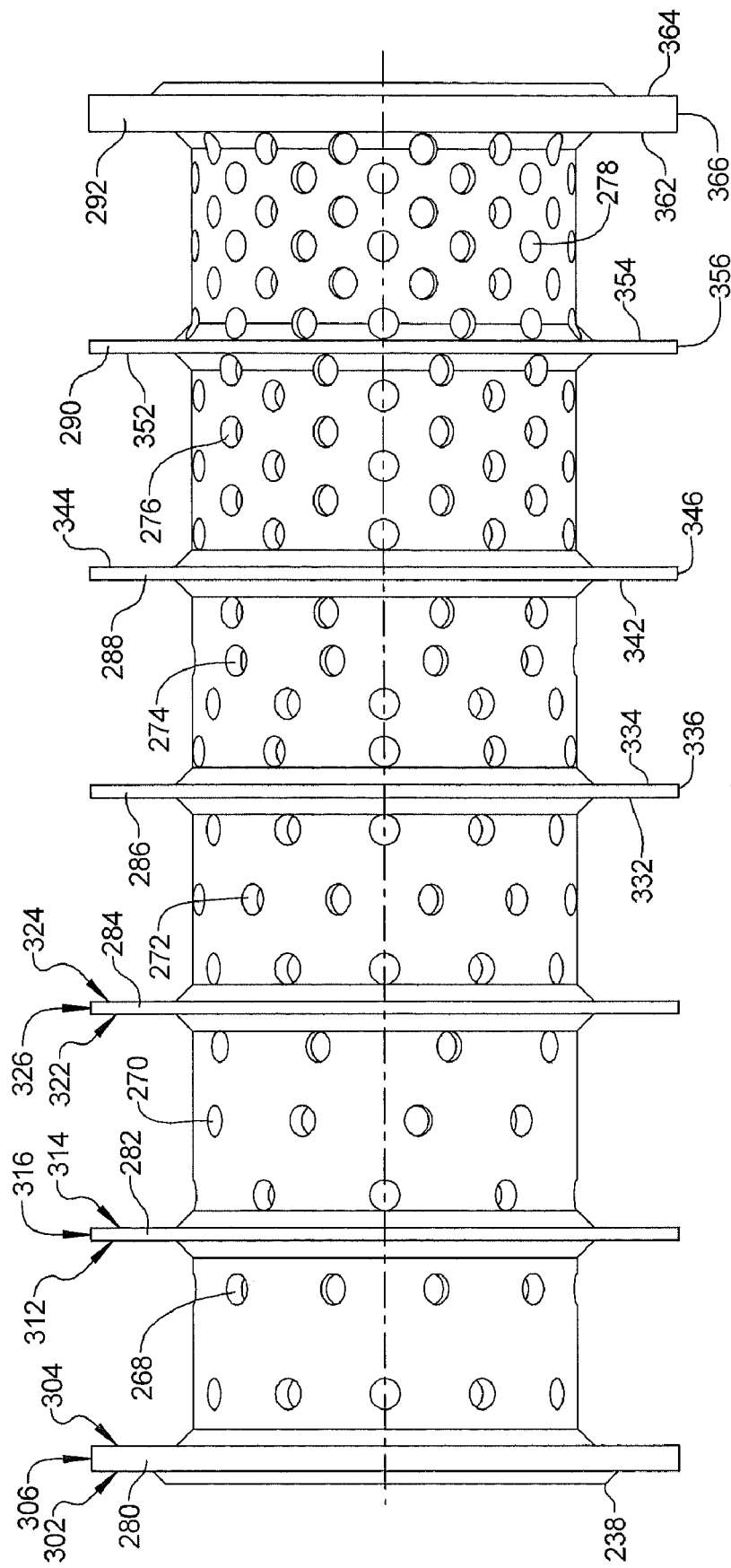
FIG. 7 is a side view of the inner portion of FIG. 6.
Figure 8:
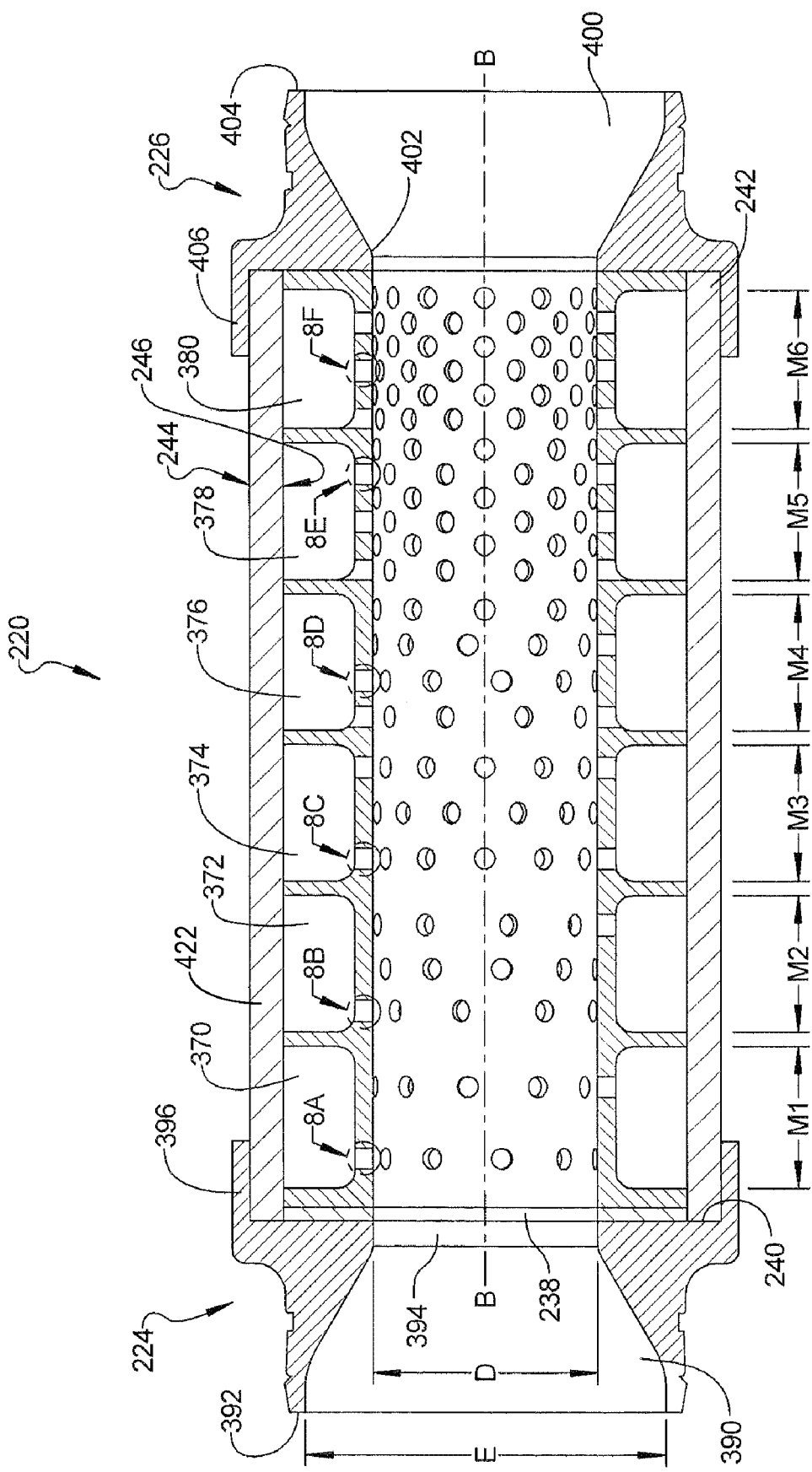
FIG. 8 is a partial sectional view of the inner portion of FIG. 6.

In the exemplary embodiment illustrated, the shell 222 is a generally cylindrical housing and includes a first end 240, a second end 242, a shell outside surface 244, and a shell inside surface 246. As best seen in FIGS. 6-8, the conduit portion 232 includes a first conduit portion 250, a second conduit portion 252, a third conduit portion 254, a fourth conduit portion 256, a fifth conduit portion 258, a sixth conduit portion 260, an outside conduit surface 264, an inside conduit surface 266, a plurality of first conduit apertures 268, a plurality of second conduit apertures 270, a plurality of third conduit apertures 272, a plurality of fourth conduit apertures 274, a plurality of fifth conduit apertures 276, a plurality of sixth conduit apertures 278, a generally annular first wall 280, a generally annular second wall 282, a generally annular third wall 284, a generally annular fourth wall 286, a generally annular fifth wall 288, a generally annular sixth wall 290, and a generally annular seventh wall 292.

In the illustration of FIG. 7, all of the apertures shown in the sectioned portion of the first conduit portion 250 are first conduit apertures 268, all of the apertures shown in the sectioned portion of the second conduit portion 252 are second conduit apertures 270, all of the apertures shown in the sectioned portion of the third conduit portion 254 are third conduit apertures 272, all of the apertures shown in the sectioned portion of the fourth conduit portion 256 are fourth conduit apertures 274, all of the apertures shown in the sectioned portion of the fifth conduit portion 258 are fifth conduit apertures 276, and all of the apertures shown in the sectioned portion of the sixth conduit portion 260 are sixth conduit apertures 278.

The first wall 280 includes a generally annular first surface 302, a generally annular second surface 304, and a generally cylindrical wall outer surface 306. The second wall 282 includes a generally annular first surface 312, a generally annular second surface 314, and a generally cylindrical wall outer surface 316. The third wall 284 includes a generally annular first surface 322, a generally annular second surface 324, and a generally cylindrical wall outer surface 326. The fourth wall 286 includes a generally annular first surface 332, a generally annular second surface 334, and a generally cylindrical wall outer surface 336. The fifth wall 288 includes a generally annular first surface 342, a generally annular second surface 344, and a generally cylindrical wall outer surface 346. The sixth wall 290 includes a generally annular first surface 352, a generally annular second surface 354, and a generally cylindrical wall outer surface 356. The seventh wall 292 includes a generally annular first surface 362, a generally annular second surface 364, and a generally cylindrical wall outer surface 366.

The shell inside surface 246, the outside conduit surface 264, the second surface 304 of the first wall 280 and the first surface 312 of the second wall 282 define a first chamber 370. The shell inside surface 246, the outside conduit surface 264, the second surface 314 of the second wall 282 and the first surface 322 of the third wall 284 define a second chamber 372. The shell inside surface 246, the outside conduit surface 264, the second surface 324 of the third wall 284 and the first surface 332 of the fourth wall 286 define a third chamber 374. The shell inside surface 246, the outside conduit surface 264, the second surface 334 of the fourth wall 286 and the first surface 342 of the fifth wall 288 define a fourth chamber 376. The shell inside surface 246, the outside conduit surface 264, the second surface 344 of the fifth wall 288 and the first surface 352 of the sixth wall 290 define a fifth chamber 378. The shell inside surface 246, the outside conduit surface 264, the second surface 354 of the sixth wall 290 and the first surface 362 of the seventh wall 292 define a sixth chamber 380.

As best illustrated in FIG. 8, the distance between the second surface 304 of the first wall 280 and the first surface 312 of the second wall 282 is a length M1. The distance between the second surface 314 of the second wall 282 and the first surface 322 of the third wall 284 is a length M2. The distance between the second surface 324 of the third wall 284 and the first surface 332 of the fourth wall 286 is a length M3. The distance between the second surface 334 of the fourth wall 286 and the first surface 342 of the fifth wall 288 is a length M4. The distance between the second surface 344 of the fifth wall 288 and the first surface 352 of the sixth wall 290 is a length M5. The distance between the second surface 354 of the sixth wall 290 and the first surface 362 of the seventh wall 292 is a length M6.

In the exemplary embodiment illustrated, the first chamber 370, the second chamber 372, the third chamber 374, the fourth chamber 376, the fifth chamber 378, and the sixth chamber 380 have generally the same volume. In the embodiment illustrated, the shell inside surface 246 and the outside conduit surface each have generally consistent diameters along the lengths M12, M2, M3, M4, M5, and M6. Also in the embodiment illustrated, the lengths M12, M2, M3, M4, M5, and M6 are generally equal.

In the exemplary embodiment illustrated, each first conduit aperture 268 is generally cylindrical and defined by an axis F-F, while each second conduit aperture 270 is generally cylindrical and defined by an axis G-G, each third conduit aperture 272 is generally cylindrical and defined by an axis H-H, while each fourth conduit aperture 274 is generally cylindrical and defined by an axis I-I, each fifth conduit aperture 276 is generally cylindrical and defined by an axis J-J, while each sixth conduit aperture 278 is generally cylindrical and defined by an axis K-K (as best seen in FIGS. 8A-8F), although the conduit apertures need not be cylindrical. Also in the embodiment illustrated, all conduit apertures are generally the same diameter, although desirable variations in geometry may be used.

The number of sixth conduit apertures 278 is greater than the number of the fifth conduit apertures 276 which is greater than the number of the fourth conduit apertures 274 which is greater than the number of the third conduit apertures 272 which is greater than the number of the second conduit apertures 270 which is greater than the number of the first conduit apertures 268. In one embodiment, the resonator 220 has twenty-two (22) first conduit apertures 268, twenty-eight (28) second conduit apertures 270, thirty-six (36) third conduit apertures 272, forty-two (42) fourth conduit apertures 274, sixty (60) fifth conduit apertures 276 and eighty-four (84) sixth conduit apertures 278. Also in the embodiment illustrated, the axes F-F, G-G, H-H, I-I, J-J, and K-K intersect the axis A-A. As best seen in FIGS. 6-8, the conduit apertures 268, 270, 272, 274, 276, and 278 are generally evenly distributed within their respective conduit portion.

The inlet 224 is defined by a throat 390 for directing fluid flow from a first inlet end 392 to a second inlet end 394, and a flange 396 for coupling the inlet 224 to the shell 422. The mating flange 238 seals with the second inlet end 394. The outlet 226 is defined by a throat 400 for directing fluid flow from a first inlet end 402 to a second inlet end 404, and a flange 406 for coupling the outlet 226 to the shell 422.

Figure 8A:
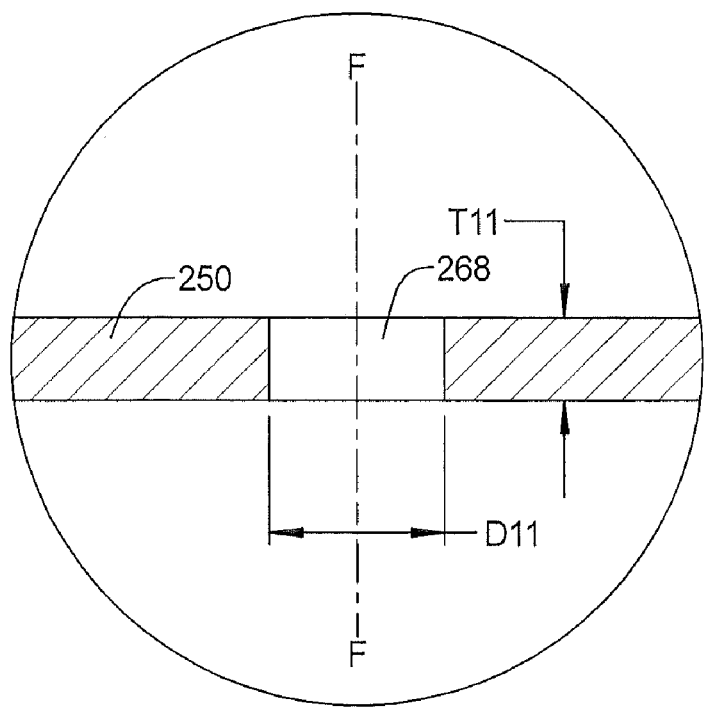
FIG. 8A is an enlarged view of portion 8A of FIG. 8.
Figure 8B:
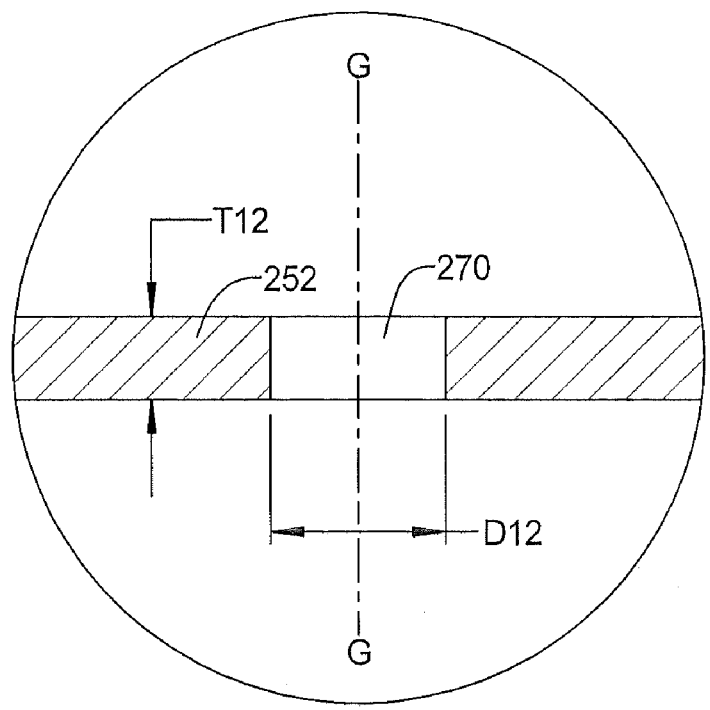
FIG. 8B is an enlarged view of portion 8B of FIG. 8.
Figure 8E:
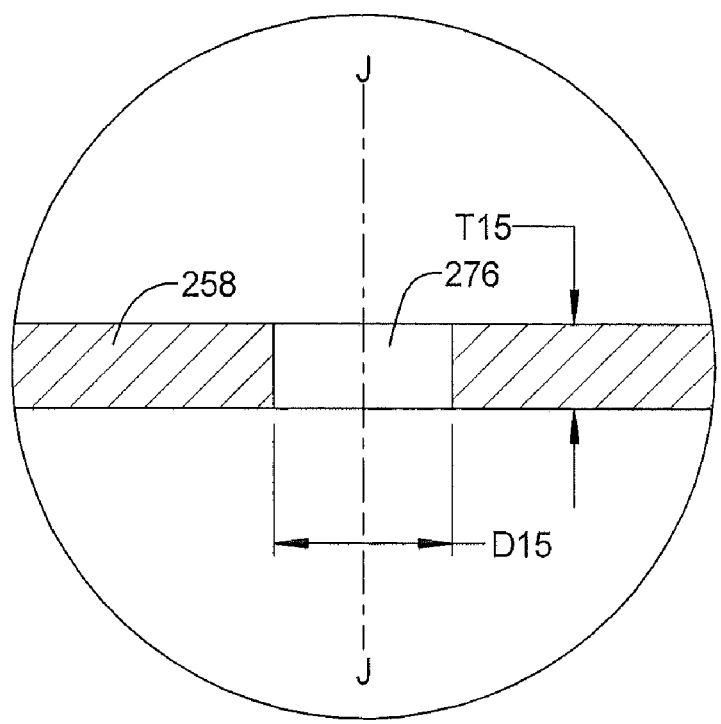
FIG. 8E is an enlarged view of portion 8E of FIG. 8.
Figure 8F:
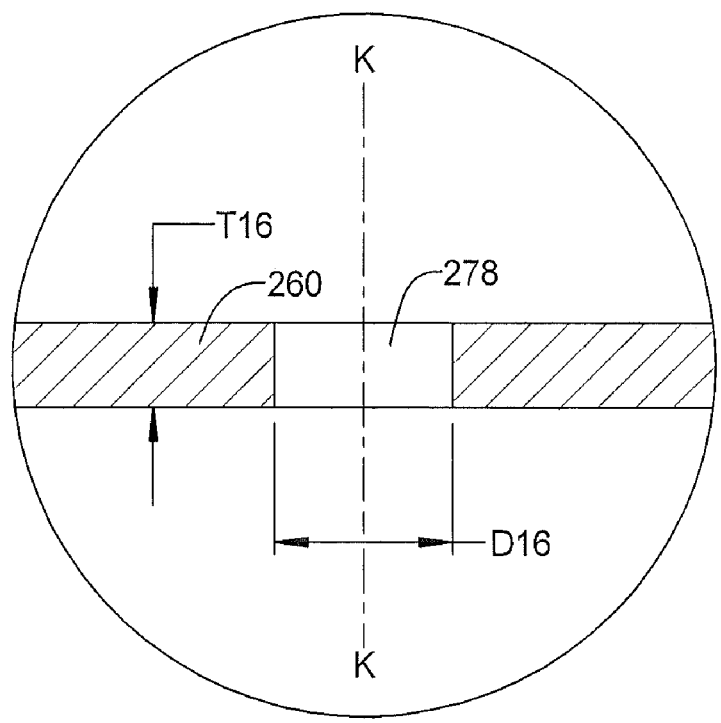
FIG. 8F is an enlarged view of portion 8F of FIG. 8.

As best seen in FIG. 8A, an exemplary first conduit aperture 268 generally defines a first diameter D11 and a first thickness T11, which is generally the thickness of the first conduit portion 250. Referring to FIG. 8B, an exemplary second conduit aperture 270 generally defines a second diameter D12 and a second thickness T12, which is generally the thickness of the second conduit portion 252. FIG. 8C illustrates an exemplary third conduit aperture 272 generally defines a third diameter D13 and a third thickness T13, which is generally the thickness of the third conduit portion 254. FIG. 8D illustrates an exemplary fourth conduit aperture 274 generally defines a fourth diameter D14 and a fourth thickness T14, which is generally the thickness of the fourth conduit portion 256. FIG. 8E illustrates an exemplary fifth conduit aperture 276 generally defines a fifth diameter D15 and a fifth thickness T15, which is generally the thickness of the fifth conduit portion 258. FIG. 8F illustrates an exemplary sixth conduit aperture 278 generally defines a sixth diameter D16 and a sixth thickness T16, which is generally the thickness of the sixth conduit portion 260.

The total area provided between the interior of the conduit portion 232 and the first chamber 370 is equal to the number of first conduit apertures 268 multiplied by the area of each first conduit aperture 268. Similarly, the total area provided between the interior of the conduit portion 232 and the second chamber 372 is equal to the number of second conduit apertures 270 multiplied by the area of each second conduit aperture 270.

The volume of air or other fluid within the conduit apertures 58, 60, 268, 270, 272, 274, 276, and 278 of a conduit portion is generally the volume defined by the diameter and thickness multiplied by the number of apertures. As an example, the volume of air within the third conduit apertures 272 (V13, FIG. 8C) is:

$$V13 = T13 \times (D13)2 \times \pi/4 \times 36$$

where:
V13=the combined volume of air within the third conduit apertures 272
T13 is the thickness of the third conduit apertures 272
D13 is the diameter of the third conduit apertures 272
$\pi$ is pi, and
36 is the number of third conduit apertures 272.

When assembled as illustrated in FIG. 8, the first chamber 370 is generally air tight with the exception of the first conduit apertures 268, and the second chamber 372 is generally air tight with the exception of the second conduit apertures 270. The third chamber 374 is generally air tight with the exception of the third conduit apertures 272, the fourth chamber 376 is generally air tight with the exception of the fourth conduit apertures 274, the fifth chamber 378 is generally air tight with the exception of the fifth conduit apertures 276, and the sixth chamber 380 is generally air tight with the exception of the sixth conduit apertures 278. That is, air may enter and exit the chambers 370, 372, 374, 376, 378, 380 only through their respective conduit apertures, and air may enter and exit the second chamber 372 only through the second conduit apertures 270.

Figure 9:
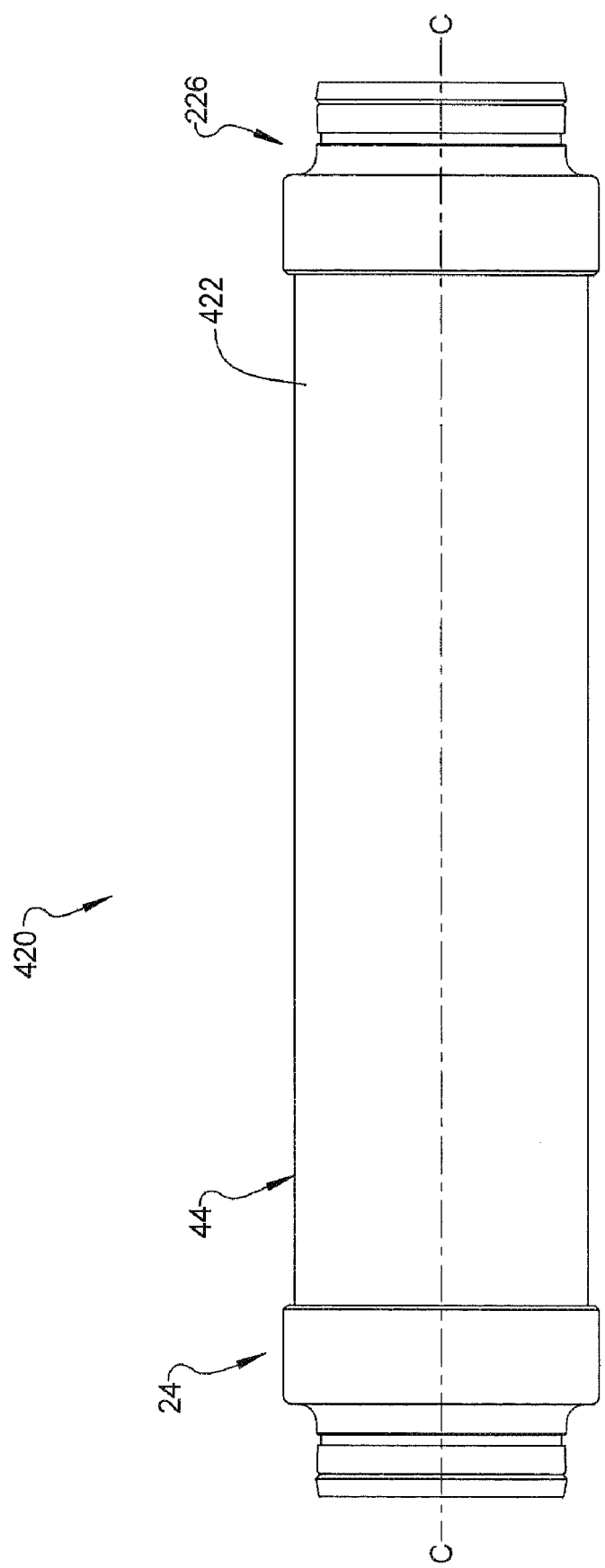
FIG. 9 is a side view of a resonator, according to an embodiment.

FIG. 9 illustrates another embodiment of a resonator as a resonator 420. The resonator 420 is generally defined by an axis C-C and includes an outer shell 422, the inlet 24 and the outlet 226. The noise resonator 420 is further illustrated in FIG. 10 to include the inner member 30 (FIGS. 2-4) and the second inner member 230 (FIGS. 6-8).

Figure 10:
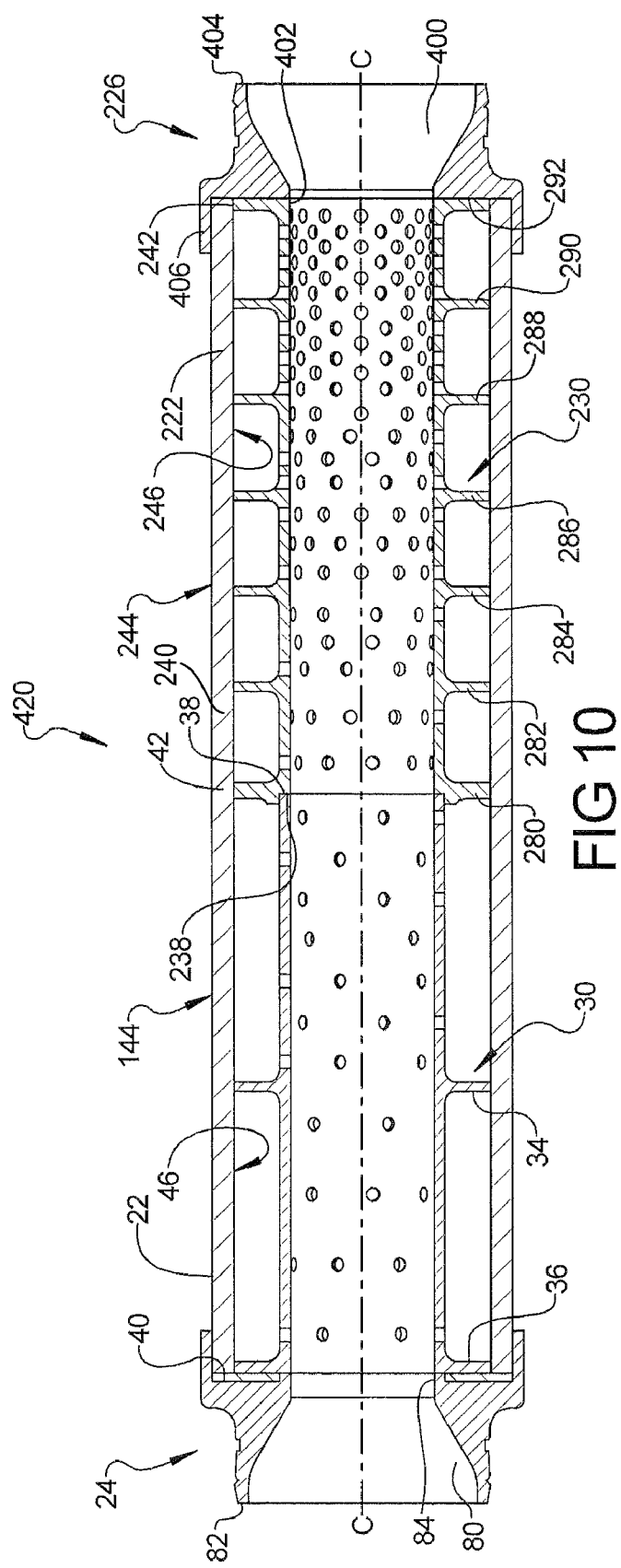
FIG. 10 is a partial sectional view of the resonator of FIG. 9.

In one exemplary embodiment illustrated, the shell 422 is formed by interconnecting the second end 42 of the shell 22 with the first end 240 of the shell 222, although the shell 422 may be formed as one continuous piece. As best seen in FIG. 10, the inner member 30 and the second inner member 230 are interposed within the shell 422 and sealed therewith as described above. Further, the mating flange 238 seals with the mating end 38 to interconnect the inner member 30 and the second inner member 230.

In the exemplary embodiment, the volume of the chambers 64, 66 is about three times greater than the volume of the chambers 370, 372, 374, 376, 378, and 380, although other ratios may be utilized, as desired. Also as illustrated, the chambers are in series connection with the conduit.

In one exemplary embodiment of operation, air will pass from the inlet to the outlet of a resonator. Generally, the air within a chamber 64, 66, 370, 372, 374, 376, 378, 380 will act as a spring while the mass of air within the apertures connecting the chamber to the conduit will resonate at a predetermined frequency. That is, the mass of the air within the apertures (volume multiplied by density) and the volume of air within the associated chamber will act as a mass and spring combination to resonate with desired frequencies and thus reduce the magnitude of these frequencies in the air that flows through the resonator. The inventors have determined that a combination of a plurality of first chambers with about the same volume having differing amounts of apertures connecting the first chambers with a conduit, and a plurality of second chambers with about the same volume (but different from the volume of the first chambers) having differing amounts of apertures connecting the second chambers with the conduit will provide a resonator that may be easily manufactured while reducing a plurality of differing frequencies to reduce the noise output of an engine.

Generally, the dimensions associated with the chamber 64, positioned near the inlet, are tuned to resonate with lower frequencies, and each successive chamber from the inlet to the outlet will resonate with successively higher frequencies since the lower frequencies are associated with greater energy, and the higher frequency chambers (such as chambers 376, 378) may reduce a greater amount of the tuned frequency in the absence of high amounts of resonate energy within the conduit adjacent the higher frequency chambers. The resonators may be manufactured of any suitable material, such as plastics, since the volumes, and not the stiffness, of the resonator is the primary factor in reducing noise.

Generally, the chambers are formed as the conduit portions are interposed within the shells. Forming the illustrated components and apertures may be accomplished by any known methods.

Figure 11:
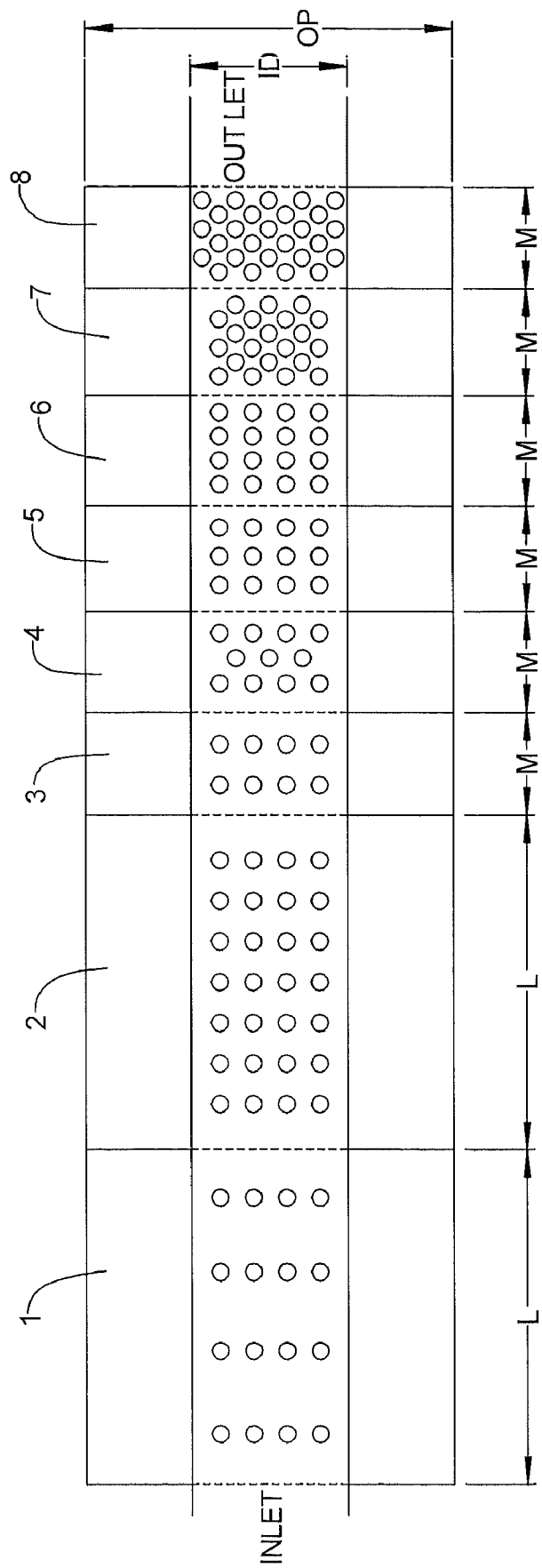
FIG. 11 is a schematic illustration of the sectional view of the resonator of FIG. 10.
Figure 12:
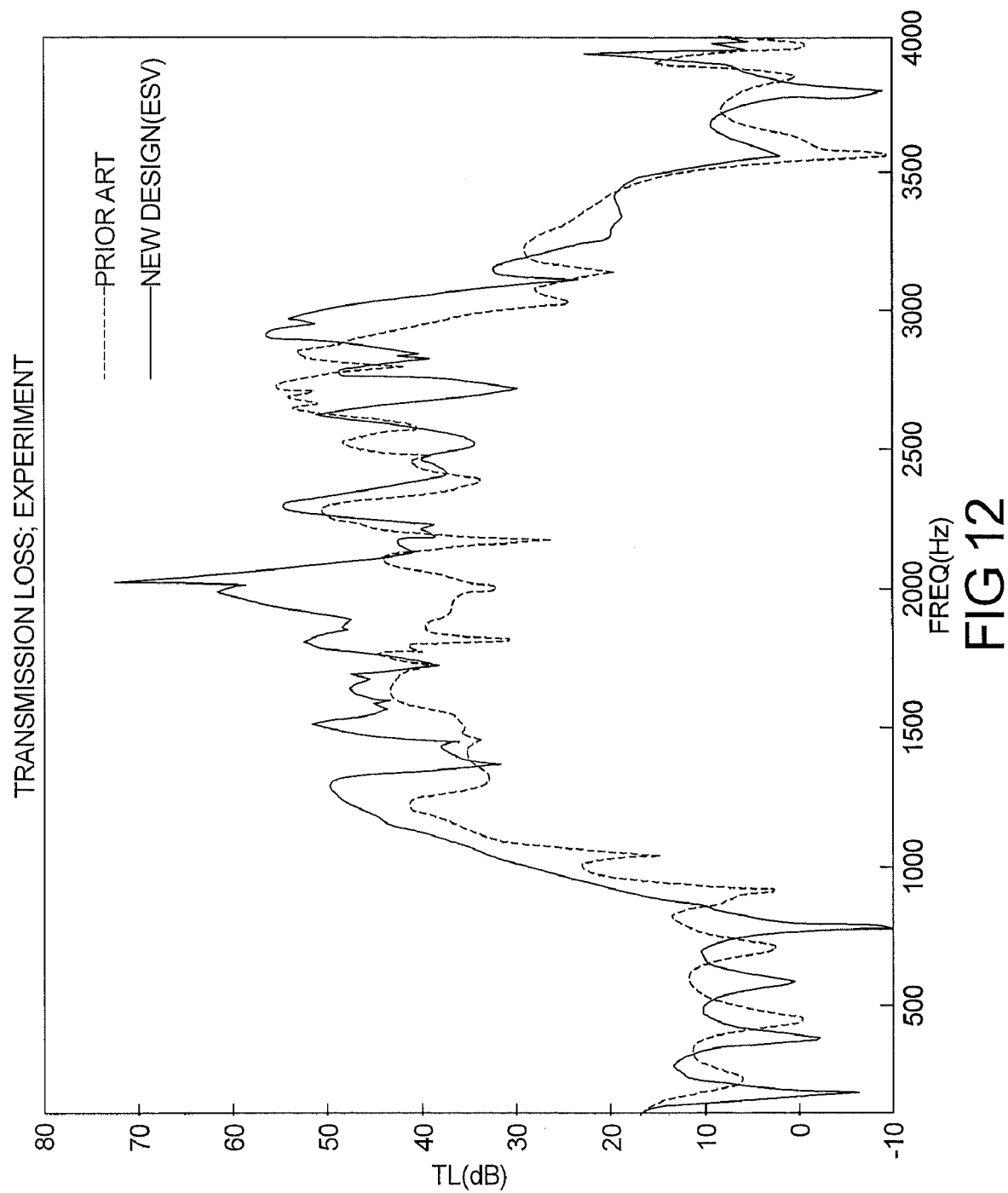
FIG. 12 is a graphical representation of a prediction of losses in each chamber of the resonator of FIG. 9.

FIG. 12 illustrates simulated results from testing of differing resonators. In FIG. 12, a prior art resonator (modeled after the resonator of U.S. Pat. No. 5,979,598) is compared to a resonator having the schematic dimensions of FIG. 11. As used herein, the transmission loss (TL) in FIG. 12 for various frequencies is the difference in sound power between the wave exiting the muffler into a tube that is anechoically terminated and the wave exiting a straight pipe section replacing the muffler and is anechoically terminated also. As illustrated the prior are resonator exhibited a lower transmission loss for much of the frequency range than the resonator in FIG. 11, especially between 1800 and 2300 Hz.

Figure 13:
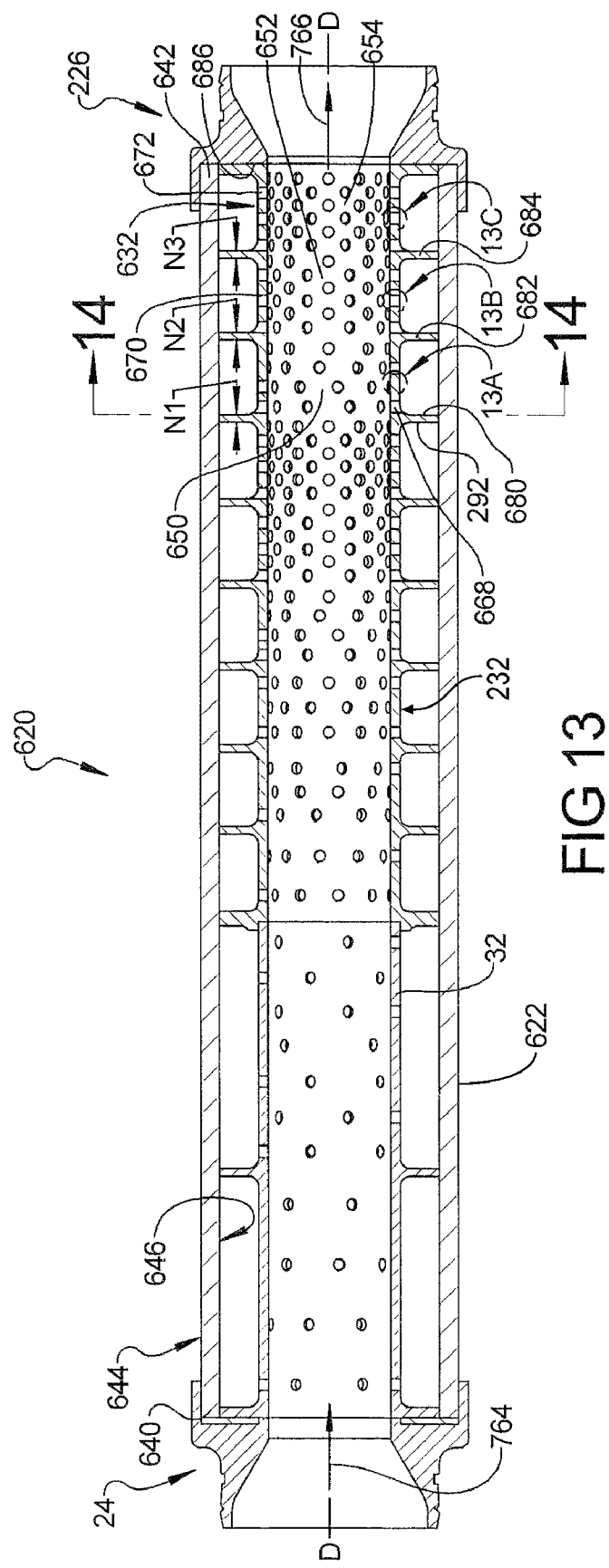
FIG. 13 is a side view of a resonator, according to an embodiment, with a baffle portion deleted for clarity.
Figure 14:
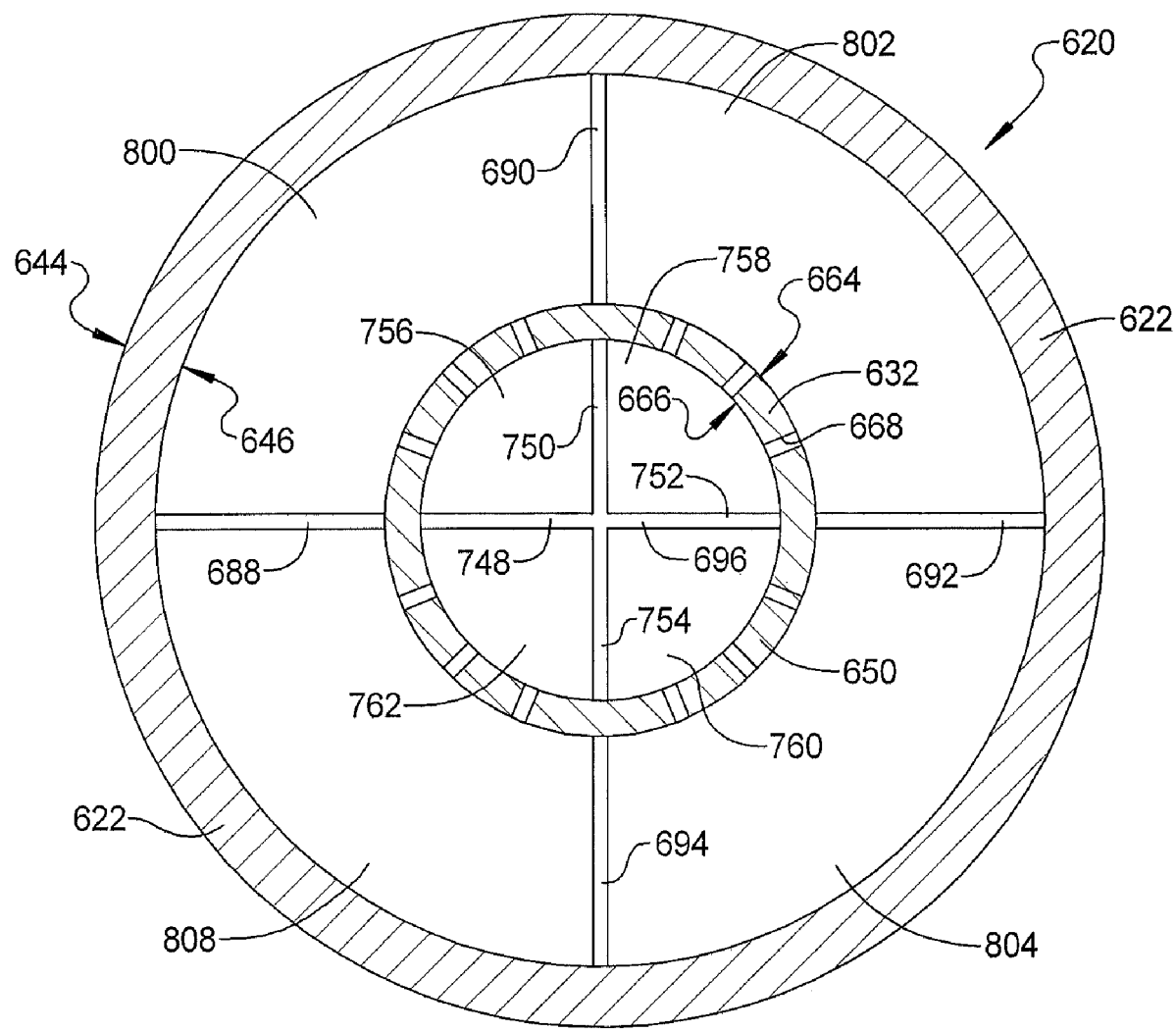
FIG. 14 is a partial sectional view taken along line 14-14 of FIG. 13.
Figure 15:
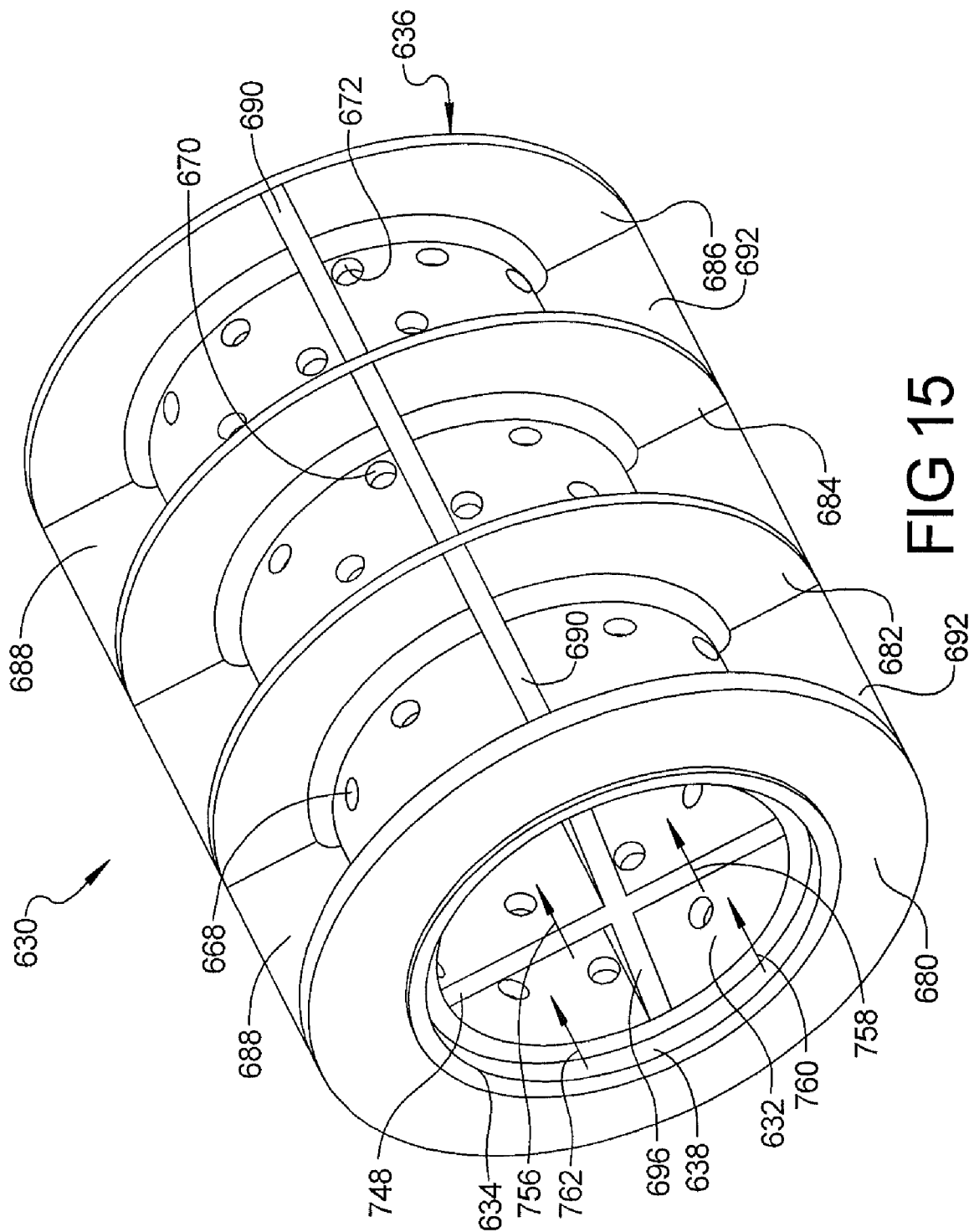
FIG. 15 is a perspective view of a portion of the resonator of FIG. 13.

FIGS. 13, 14, and 15 illustrate another embodiment of a resonator as a resonator 620. The resonator 620 is generally defined by an axis D-D and includes an outer shell 622, the inlet 24 and the outlet 226. The noise resonator 620 is further illustrated in FIG. 13 to include the inner member 30 (FIGS. 2-4), the second inner member 230 (FIGS. 6-8), and a third inner member 630.

The third inner member 630 is illustrated in FIG. 15 to include a conduit portion 632, a first inner member end 634, a second inner member end 636, and a mating flange 638. The mating flange 638 contacts the second inner member 230, while the second inner member end 636 contacts the outlet 226.

In the exemplary embodiment illustrated, the shell 622 is a generally cylindrical housing and includes a first end 640, a second end 642, a shell outside surface 644, and a shell inside surface 646. The conduit portion 632 includes a first conduit portion 650, a second conduit portion 652, a third conduit portion 654, an outside conduit surface 664, an inside conduit surface 666, a plurality of first conduit apertures 668, a plurality of second conduit apertures 670, a plurality of third conduit apertures 672, a generally annular first wall 680, a generally annular second wall 682, and a generally annular third wall 684. Referring to FIGS. 14 and 15, the conduit portion 632 also includes a generally radially extending first divider 688, a generally radially extending second divider 690, a generally radially extending third divider 692, a generally radially extending fourth divider 694, and a central divider 696. The dividers 688, 690, 692, 694, and 696 are omitted from FIG. 13 for clarity of illustration.

As best seen in FIGS. 13 and 15, all of the apertures in the first conduit portion 650 are first conduit apertures 668, all of the apertures shown in the sectioned portion of the second conduit portion 652 are second conduit apertures 670, all of the apertures shown in the sectioned portion of the third conduit portion 654 are third conduit apertures 672, and all of the apertures shown in the sectioned portion of the fourth conduit portion 656 are fourth conduit apertures 674.

The first wall 680 includes a generally annular first surface 702, a generally annular second surface 704, and a generally cylindrical wall outer surface 706. The second wall 682 includes a generally annular first surface 712, a generally annular second surface 714, and a generally cylindrical wall outer surface 716. The third wall 684 includes a generally annular first surface 722, a generally annular second surface 724, and a generally cylindrical wall outer surface 726. The fourth wall 686 includes a generally annular first surface 732, a generally annular second surface 734, and a generally cylindrical wall outer surface 736.

The central divider 696 is illustrated in FIGS. 14 and 15 to include a generally radially extending first central divider portion 748, a generally radially extending second central divider portion 750, a generally radially extending third central divider portion 752, and a generally radially extending fourth central divider portion 754. Flow of a fluid through the resonator 620 is divided into a first path 756, a second path 758, a third path 760, and a forth path 762 by the central divider 696. That is, the dividers 688, 690, 692, 694, and 696 segregate the flow through the resonator 620 into four flow paths. Specifically, the fluid that flows through the conduit portion 32 and the second conduit portion 232 is divided into the four flow paths 756, 758, 760, and 762. The dividers 688, 690, 692, 694, and 696 also segregate each of the chambers 770, 772, and 774 into distinct regions with no radial or circumferential fluid communication therebetween, as discussed in greater detail below.

While four flow paths 756, 758, 760, and 762 are described, portions of the resonator 620 may be segregated into any suitable number of flow paths, as desired. Further, the dividers 688, 690, 692, 694 may each include multiple portions, with a portion of each divider extending between two adjacent walls of the walls 680, 682, 684, 686. As best seen in FIG. 13, during operation, fluid will flow through the inlet 24 into the resonator 620 in an inlet flow path 764, flow through the conduit portion 32 and the second conduit portion 232, and then segregate into one of the flow paths 756, 758, 760, and 762. The fluid flowing through the flow paths 756, 758, 760, and 762 will merge into a singular flow path 766 within the outlet 226.

The shell inside surface 646, the outside conduit surface 664, the second surface 704 of the first wall 680 and the first surface 712 of the second wall 682 define a first chamber 770. The shell inside surface 646, the outside conduit surface 664, the second surface 714 of the second wall 682 and the first surface 722 of the third wall 684 define a second chamber 772. The shell inside surface 646, the outside conduit surface 664, the second surface 724 of the third wall 684 and the first surface 732 of the fourth wall 686 define a third chamber 774. In one embodiment, the first wall 680 may be deleted and the sixth wall 292 may define the first chamber 770.

As best illustrated in FIG. 13, the distance between the second surface 704 of the first wall 680 and the first surface 712 of the second wall 682 is a length N1. The distance between the second surface 714 of the second wall 682 and the first surface 722 of the third wall 684 is a length N2. The distance between the second surface 724 of the third wall 684 and the first surface 732 of the fourth wall 686 is a length N3.

In the exemplary embodiment illustrated, the first chamber 770, the second chamber 772, and the third chamber 774 have generally the same volume. In the embodiment illustrated, the shell inside surface 646 and the outside conduit surface each have generally consistent diameters along the lengths N1, N2, and N3. Also in the embodiment illustrated, the lengths N1, N2, and N3 are generally equal.

Figure 13A:
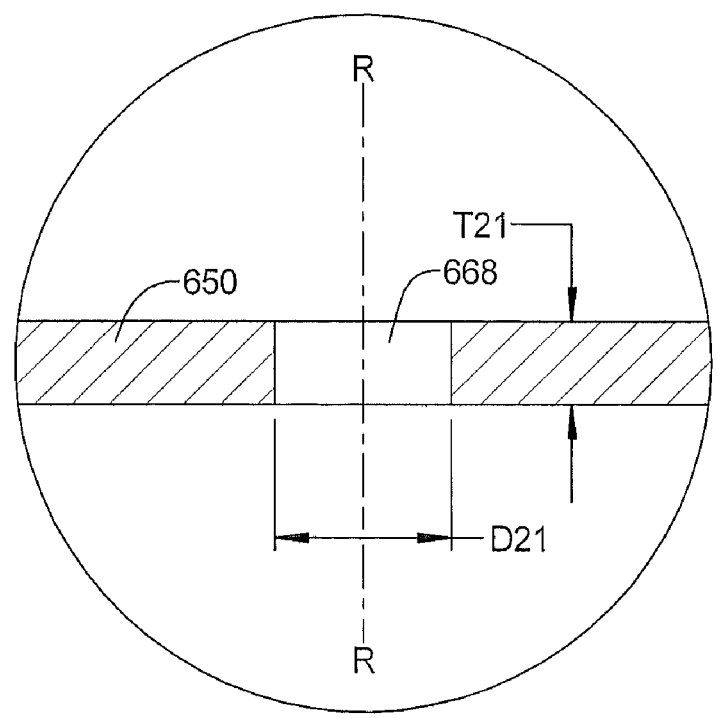
FIG. 13A is an enlarged view of portion 13A of FIG. 13.
Figure 13B:
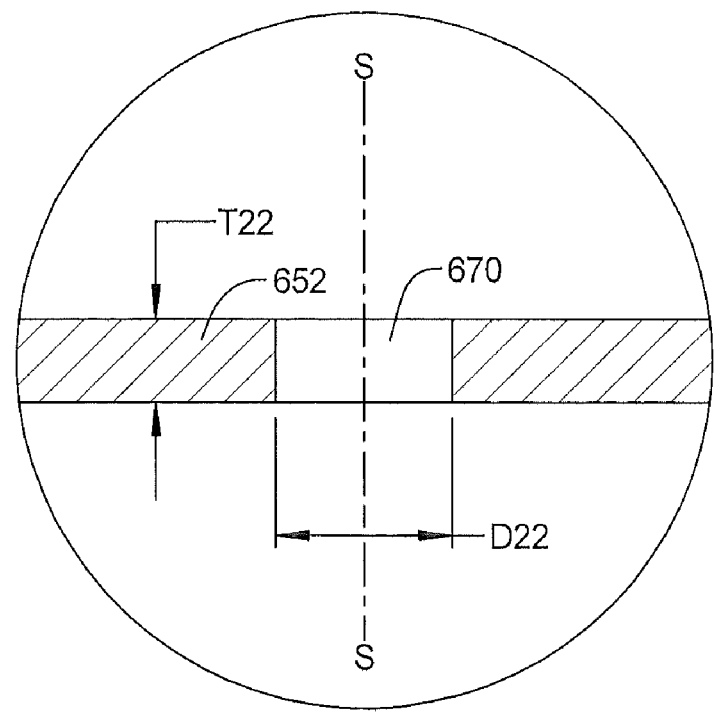
FIG. 13B is an enlarged view of portion 13B of FIG. 13.
Figure 13C:
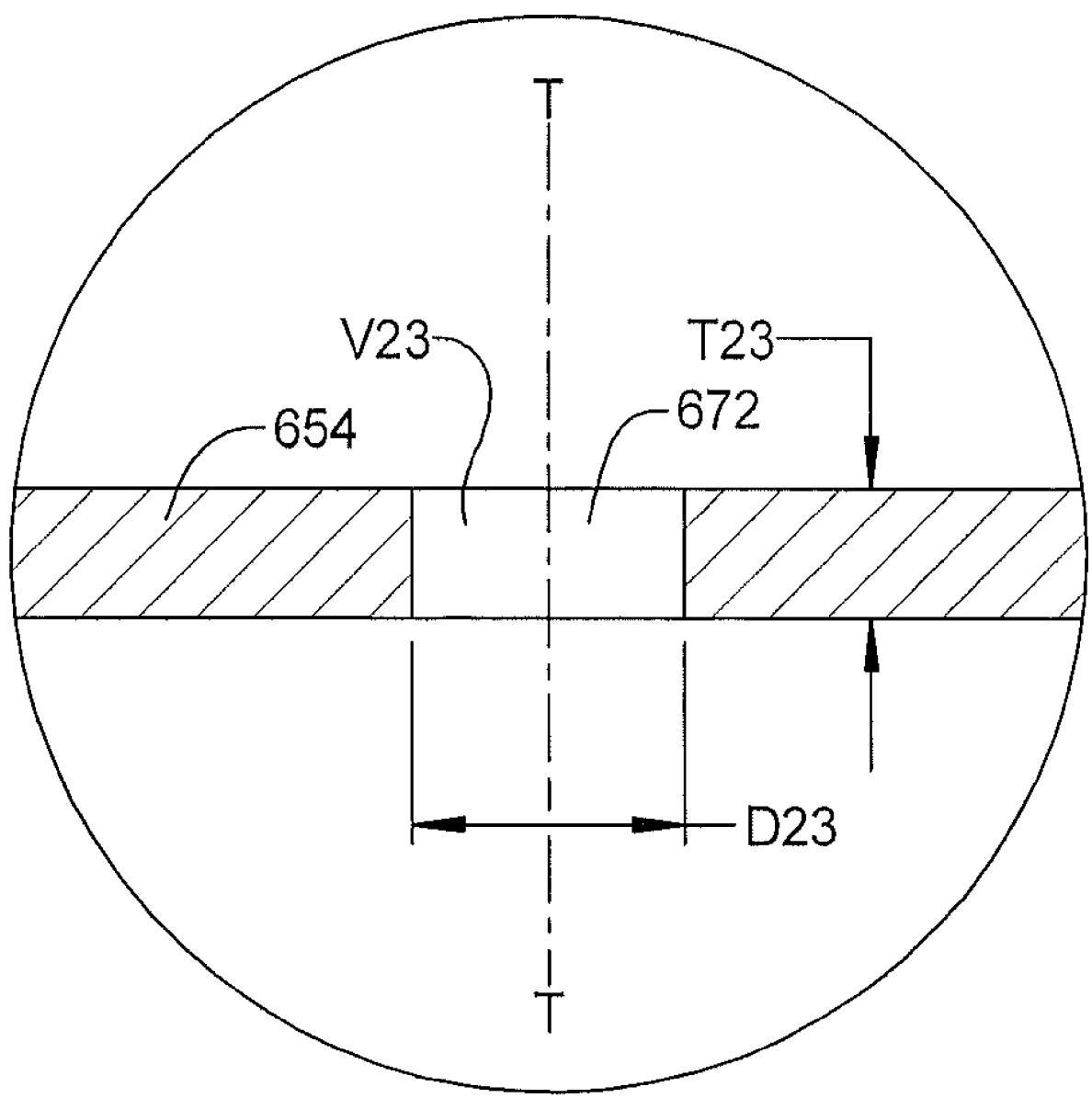
FIG. 13C is an enlarged view of portion 13C of FIG. 13.

In the exemplary embodiment illustrated, each first conduit aperture 668 is generally cylindrical and defined by an axis R-R, while each second conduit aperture 670 is generally cylindrical and defined by an axis S-S, each third conduit aperture 672 is generally cylindrical and defined by an axis T-T, (as best seen in FIGS. 13A-13CF), although the conduit apertures need not be cylindrical. Also in the embodiment illustrated, all conduit apertures are generally the same diameter, although desirable variations in geometry may be used.

The number of the third conduit apertures 672 is greater than the number of the second conduit apertures 670 which is greater than the number of the first conduit apertures 668. In one embodiment, the resonator 620 has twenty-two (22) first conduit apertures 668, twenty-eight (28) second conduit apertures 670, thirty-six (36) third conduit apertures 672. Also in the embodiment illustrated, the axes R-R, S-S, and T-T intersect the axis A-A. As best seen in FIGS. 13 and 15, the conduit apertures 668, 670, 672 are generally evenly distributed within their respective conduit portion and between the dividers 688, 690, 692, 694, and 696.

The inlet 24 is defined by a throat 790 for directing fluid flow from a first inlet end 792 to a second inlet end 794, and a flange 796 for coupling the inlet 24 to the shell 422. The mating flange 638 seals with the second inlet end 794. As described above, the outlet 226 is defined by a throat 400 for directing fluid flow from a first inlet end 402 to a second inlet end 404, and a flange 406 for coupling the outlet 226 to the shell 422.

As best seen in FIG. 13A, an exemplary first conduit aperture 668 generally defines a first diameter D21 and a first thickness T21, which is generally the thickness of the first conduit portion 650. Referring to FIG. 13B, an exemplary second conduit aperture 670 generally defines a second diameter D22 and a second thickness T22, which is generally the thickness of the second conduit portion 652. FIG. 13C illustrates an exemplary third conduit aperture 672 generally defines a third diameter D23 and a third thickness T23, which is generally the thickness of the third conduit portion 654.

The total area provided between the interior of the conduit portion 632 and the first chamber 694 is equal to the number of first conduit apertures 668 multiplied by the area of each first conduit aperture 668. Similarly, the total area provided between the interior of the conduit portion 632 and the second chamber 696 is equal to the number of second conduit apertures 670 multiplied by the area of each second conduit aperture 670.

The volume of air or other fluid within the conduit apertures 58, 60, 268, 270, 272, 274, 276, 278, 668, 670, and 672 of a conduit portion is generally the volume defined by the diameter and thickness multiplied by the number of apertures. As an example, the volume of air within the second conduit apertures 670 (V22, FIG. 13B) is:

$$V22 = T22 \times (D22)2 \times \pi/4 \times 36$$

where:
V22=the combined volume of air within the second conduit apertures 670
T22 is the thickness of the second conduit apertures 670
D22 is the diameter of the second conduit apertures 670
$\pi$ is pi, and
36 is the number of second conduit apertures 670.

When assembled as illustrated in FIG. 13, the first chamber 770 is generally air tight with the exception of the first conduit apertures 668, and the second chamber 772 is generally air tight with the exception of the second conduit apertures 670. The third chamber 774 is generally air tight with the exception of the third conduit apertures 672, the fourth chamber 776 is generally air tight with the exception of the fourth conduit apertures 674, the fifth chamber 778 is generally air tight with the exception of the fifth conduit apertures 676, and the sixth chamber 780 is generally air tight with the exception of the sixth conduit apertures 678. That is, air may enter and exit the chambers 770, 772, 774, 776, 778, 780 only through their respective conduit apertures 668, and air may enter and exit the second chamber 666 only through the second conduit apertures 670.

In one exemplary embodiment illustrated, the shell 622 is formed by interconnecting the second end 62 of the shell 22 with the first end 240 of the shell 222, although the shell 622 may be formed as one continuous piece. As best seen in FIG. 10, the inner member 30 and the second inner member 230 are interposed within the shell 622 and sealed therewith as described above. Further, the mating flange 238 seals with the mating end 38 to interconnect the inner member 30 and the second inner member 230.

In the exemplary embodiment, the volume of the chambers 64, 66 is about three times greater than the volume of the chambers 370, 372, 374, 376, 378, and 380, although other ratios may be utilized, as desired. Also as illustrated, the chambers are in series connection with the conduit.

In one exemplary embodiment of operation, air will pass from the inlet to the outlet of a resonator. Generally, the air within a chamber 64, 66, 370, 372, 374, 376, 378, 380 will act as a spring while the mass of air within the apertures connecting the chamber to the conduit will resonate at a predetermined frequency. That is, the mass of the air within the apertures (volume multiplied by density) and the volume of air within the associated chamber will act as a mass and spring combination to resonate with desired frequencies and thus reduce the magnitude of these frequencies in the air that flows through the resonator. The inventors have determined that a combination of a plurality of first chambers with about the same volume having differing amounts of apertures connecting the first chambers with a conduit, and a plurality of second chambers with about the same volume (but different from the volume of the first chambers) having differing amounts of apertures connecting the second chambers with the conduit will provide a resonator that may be easily manufactured while reducing a plurality of differing frequencies to reduce the noise output of an engine.

Generally, the dimensions associated with the chamber 64, positioned near the inlet, are tuned to resonate with lower frequencies, and each successive chamber from the inlet to the outlet will resonate with successively higher frequencies since the lower frequencies are associated with greater energy, and the higher frequency chambers (such as chambers 376, 378) may reduce a greater amount of the tuned frequency in the absence of high amounts of resonate energy within the conduit adjacent the higher frequency chambers. The resonators may be manufactured of any suitable material, such as plastics, since the volumes, and not the stiffness, of the resonator is the primary factor in reducing noise. Referring to the resonator 620, the portion including the inner member 30 may be referred to as a low frequency section, the portion including the second inner member 230 may be referred to as a mid frequency section, the portion including the third inner member 630 may be referred to as a high frequency section, as desired.

Generally, the chambers are formed as the conduit portions are interposed within the shells. Forming the illustrated components and apertures may be accomplished by any known methods.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An apparatus comprising:
a conduit portion having a first end, a second end, a conduit inner surface and a conduit outer surface;
a plurality of chambers in series and in fluid communication with the conduit portion including:
a first chamber defined, at least in part, by a first outer housing and a first chamber volume, wherein the first chamber is in fluid communication with the conduit portion through a plurality of first conduit apertures, and wherein the fluid is permitted to flow between the conduit portion and the first chamber through a first flow area;
a second chamber defined, at least in part, by a second outer housing and a second chamber volume, wherein the second chamber is in fluid communication with the conduit portion through a plurality of second conduit apertures, and wherein the fluid is permitted to flow between the conduit portion and the second chamber through a second flow area; and
a third chamber defined, at least in part, by a third outer housing and a third chamber volume such that the second chamber is disposed between the first chamber and the third chamber, wherein the third chamber is in fluid communication with the conduit portion through a plurality of third conduit apertures, and wherein the fluid is permitted to flow between the conduit portion and the third chamber through a third flow area,
wherein the chambers are adjacently aligned in series and the pluralities of apertures formed in the conduit portion increase in the direction of the fluid flow between the first end and the second end, such that the plurality of third conduit apertures formed in the conduit portion is greater in number than the plurality of second conduit apertures formed in the conduit portion and the plurality of second conduit apertures is greater in number than the plurality of first conduit apertures formed in the conduit portion.

2. The apparatus of claim 1, further comprising a fourth chamber defined, at least in part, by a fourth outer housing and a fourth chamber volume, wherein the fourth chamber is closer to the second end than the third chamber and is in fluid communication with the conduit portion through a plurality of fourth conduit apertures, and wherein a fluid is permitted to flow between the conduit portion and the fourth chamber through a fourth flow area, wherein the third chamber volume is generally equal to the fourth chamber volume and the third flow area is greater than the fourth flow area, and wherein the plurality of fourth conduit apertures formed in the conduit portion is greater in number than the plurality of third conduit apertures formed in the conduit portion.

3. The apparatus of claim 2, further comprising a chamber divider portion interposed at least partially within the fourth chamber such that at least a portion of the fourth chamber is divided into a plurality of fourth chamber sections, wherein only a portion of the fluid that flows through the first section will flow through each of the fourth chamber sections.

4. The apparatus of claim 2, further comprising a fifth chamber defined, at least in part, by a fifth outer housing and a fifth chamber volume, wherein the fifth chamber is closer to the second end than the fourth chamber and is in fluid communication with the conduit portion through a plurality of fifth conduit apertures, and wherein a fluid is permitted to flow between the conduit portion and the fifth chamber through a fifth flow area, wherein the fourth chamber volume is generally equal to the fifth chamber volume and the fourth flow area is greater than the fifth flow area, and wherein the plurality of fifth conduit apertures formed in the conduit portion is greater in number than the plurality of fourth conduit apertures formed in the conduit portion.

5. The apparatus of claim 4, wherein the first chamber is upstream of the second chamber, the second chamber is upstream of the third chamber, the third chamber is upstream of the fourth chamber, the fourth chamber is upstream of the fifth chamber and wherein the plurality of chambers are arranged in series and are in fluid communication only with the conduit portion.

6. The apparatus of claim 1, wherein the first flow area is defined by the combined sectional area of at least 20 apertures to provide fluid communication with the first chamber, wherein the sectional area is measured generally perpendicular to the flow of fluid.

7. The apparatus of claim 4, wherein each aperture has about the same sectional area.

8. The apparatus of claim 4, wherein the conduit portion has at least 30 apertures to provide fluid communication with the first chamber.

9. The apparatus of claim 1, wherein each of the plurality of chambers are in fluid communication with only the conduit portion.

10. The apparatus of claim 1, wherein the first chamber, the second chamber, and the third chamber are substantially equal in volume.

11. The apparatus of claim 1, wherein the first chamber is in fluid communication with the conduit portion via a plurality of first apertures defining a first sectional area, the second chamber is in fluid communication with the conduit portion via a plurality of second apertures defining a second sectional area, and wherein the first sectional area is greater than the second sectional area.

12. The apparatus of claim 1, wherein the conduit selectively permits a fluid to enter a compressor portion and an internal combustion engine.

13. A method reducing acoustic energy in an engine intake, comprising:
forming a first chamber defined, at least in part, by a first outer housing and a first chamber volume, wherein the first chamber is in fluid communication with a conduit portion through a first plurality of apertures formed in the conduit, and permitting a fluid to flow between the conduit portion and the first chamber through a first flow area;
forming a second chamber defined, at least in part, by a second outer housing and a second chamber volume, wherein the second chamber is in fluid communication with the conduit portion through a second plurality of apertures formed in the conduit, and permitting a fluid to flow between the conduit portion and the second chamber through a second flow area, wherein the first chamber volume is generally equal to the second chamber;

forming a third chamber defined, at least in part, by a third outer housing and a third chamber volume, wherein the third chamber is in fluid communication with the conduit portion through a third plurality of apertures formed in the conduit, and permitting a fluid to flow between the conduit portion and the third chamber through a third flow area; and increasing the plurality of apertures formed in the conduit in each chamber in the direction of the fluid flow.

14. The method of claim 13, further comprising directing a fluid to a compressor and an internal combustion engine through the conduit portion.

15. The method of claim 13, further comprising forming a fourth chamber defined, at least in part, by a fourth outer housing and a fourth chamber volume, wherein the fourth chamber is in fluid communication with the conduit portion through a fourth plurality of apertures formed in the conduit, the fourth plurality being greater than the third plurality, and permitting a fluid to flow between the conduit portion and the fourth chamber through a fourth flow area, wherein the third chamber volume is generally equal to the fourth chamber volume and the third flow area is greater than the fourth flow area.

16. The method of claim 15, further comprising dividing the fourth chamber into a plurality of chambers and directing fluid flow such that a portion of fluid that flows through the first section will flow through each of the fourth chamber sections.

17. The method of claim 15, further comprising forming a fifth chamber defined, at least in part, by a fifth outer housing and a fifth chamber volume, wherein the fifth chamber is in fluid communication with the conduit portion through a fifth plurality of apertures formed in the conduit, the fifth plurality being greater than the fourth plurality, and permitting a fluid to flow between the conduit portion and the fifth chamber through a fifth flow area, wherein the fourth chamber volume is generally equal to the fifth chamber volume and the fourth flow area is greater than the fifth flow area.

18. The method of claim 17, further comprising placing the first chamber upstream of the second chamber, placing the second chamber upstream of the third chamber, placing the third chamber upstream of the fourth chamber, placing the fourth chamber upstream of the fifth chamber and arranging the plurality of chambers in series and in fluid communication only with the conduit portion.

19. The method of claim 13, further comprising arranging the plurality of chambers in series and in fluid communication only with the conduit portion.

20. The method of claim 13, further comprising placing the first chamber in fluid communication with the conduit portion via a plurality of first apertures defining a first sectional area, placing the second chamber in fluid communication with the conduit portion via a plurality of second apertures defining a second sectional area, and setting the first sectional area greater than the second sectional area.

21. The method of claim 13, further comprising placing the first chamber upstream of the third chamber.

22. An apparatus comprising:
a conduit portion having a conduit inner surface and a conduit outer surface;
a plurality of chambers in series and in fluid communication with the conduit portion including:
a first chamber defined, at least in part, by a first outer housing and a first chamber volume, wherein the first chamber is in fluid communication with the conduit portion through a plurality of first conduit apertures, and wherein a fluid is permitted to flow between the conduit portion and the first chamber through a first flow area;
a second chamber defined, at least in part, by a second outer housing and a second chamber volume, wherein the second chamber is in fluid communication with the conduit portion through a plurality of second conduit apertures, and wherein a fluid is permitted to flow between the conduit portion and the second chamber through a second flow area, wherein the first chamber volume is generally equal to the second chamber volume;
a third chamber defined, at least in part, by a third outer housing and a third chamber volume, wherein the third chamber is in fluid communication with the conduit portion through a plurality of third conduit apertures, and wherein a fluid is permitted to flow between the conduit portion and the third chamber through a third flow area,
wherein the plurality of third conduit apertures formed in the conduit portion is greater than the plurality of second conduit apertures formed in the conduit portion, and the plurality of second conduit apertures is greater than the plurality of first conduit apertures formed in the conduit portion; and
a central divider interposed in a portion of the conduit, the central divider having a generally radially extending first central divider portion, a generally radially extending second central divider portion, a generally radially extending third central divider portion, and a generally radially extending fourth central divider portion, wherein there is no radial or circumferential flow of the fluid between the dividers.

23. The apparatus of claim 1, wherein the chambers are adjacently aligned in series, such that the pluralities of apertures increase between the first chamber and the chamber proximal the second end.

* * * * *